(12) United States Patent  
Pylant

(10) Patent No.: US 8,527,395 B2  
(45) Date of Patent: **\*Sep. 3, 2013**

(54) BUYER-DRIVEN PURCHASING LOYALTY SYSTEM AND METHOD USING AN ELECTRONIC NETWORK

(75) Inventor: Jeffrey Pylant, Naples, FL (US)

(73) Assignee: U.T.D. Remote LLC, Wilmington, DE (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/345,701

(22) Filed: Jan. 7, 2012

(65) Prior Publication Data

US 2012/0166302 A1     Jun. 28, 2012

Related U.S. Application Data

(63) Continuation of application No. 12/962,198, filed on Dec. 7, 2010, now Pat. No. 8,095,454, which is a continuation of application No. 12/330,200, filed on Dec. 8, 2008, now Pat. No. 7,848,999, which is a continuation of application No. 09/696,193, filed on Oct. 26, 2000, now Pat. No. 7,464,053.

(60) Provisional application No. 60/161,369, filed on Oct. 26, 1999.

(51) Int. Cl.
*G06Q 40/00* (2012.01)

(52) U.S. Cl.
USPC .............................. 705/37; 705/35; 705/36 R

(58) Field of Classification Search
USPC ........................................... 705/35, 36 R, 37
See application file for complete search history.

(56) References Cited

U.S. PATENT DOCUMENTS

| | | |
|---|---|---|
| 4,903,201 A | 2/1990 | Wagner |
| 5,136,501 A | 8/1992 | Silverman |
| 5,794,207 A | 8/1998 | Walker |
| 6,058,379 A | 5/2000 | Odom |
| 6,108,639 A | 8/2000 | Walker |
| 6,260,024 B1 | 7/2001 | Shkedy |
| 6,336,105 B1 | 1/2002 | Conklin |
| 6,510,418 B1 | 1/2003 | Case |
| 2001/0056395 A1 | 12/2001 | Khan |
| 2006/0015413 A1 | 1/2006 | Giovannoli |
| 2012/0035999 A1 | 2/2012 | Mesaros |

OTHER PUBLICATIONS

Barry G. Silverman et al.; "Buyer Decision Support Systems and Search Agents for eCommerce Websites"; 1-Dept. of Systems Engineering, University of Pennsylvania; 2-Equalfooting.com; Jul. 2000; 25 pages. http://citeseerx.ist.psu.edu/viewdoc/download?doi=10.1.1.37.5671&rep=rep1&type=pdf.

(Continued)

*Primary Examiner* — Lalita M Hamilton
(74) *Attorney, Agent, or Firm* — Stolowitz Ford Cowger LLP

(57) ABSTRACT

Disclosed is a method and system for effectuating a buyer-driven and buyer-executed commerce system. The system allows prospective buyers and sellers of goods and services to anonymously exchange conditional Requests For Bids and Conditional Sales Offers based on the buyer's guaranteed 'purchasing loyalty' for a self-defined minimum quantity of goods or services, and/or quality of goods of services and/or the length of time or price to which the buyer would agree to be bound or any combination of those condition's. That buyer guarantee permits a seller to easily pre-determine their offers based on the calculated value of 'capturing' that buyer's 'guaranteed purchasing loyalty'. In a preferred embodiment, the method and system of the present invention includes a controller which receives Requests For Bids from prospective buyers and also receives, stores and displays to prospective buyers bindable sales proposals from a multitude of prospective sellers.

72 Claims, 22 Drawing Sheets

(56) References Cited

OTHER PUBLICATIONS

John Kelsey et al.; "Conditional Purchase Orders"; CCS '97 Proceedings of the 4$^{th}$ ACM Conference on Computer and Communications Security; Jul. 2000; pp. 117-124.

Gross, Neil; E-Commerce: Who Owns the Rights?; Business Week. New York; Jul. 29, 1996; Iss. 3486; 3 pages.

Gebeloff, Robert; "Internet Commerce Patented? Secaucus Firm's Suit Claims Infringement;" The Record; Bergen County, N.J.; Sep. 16, 1997; 1 pg.

Lewis, Peter; "Web Concern Gets Patent for Its Model of Business;" New York Times, Late Edition (East Coast); New York, N.Y.; Aug. 10, 1998; 4 pages.

BUYER-DRIVEN PURCHASING LOYALTY SYSTEM AND METHOD USING AN ELECTRONIC NETWORK

This application is a continuation of U.S. Utility patent application Ser. No. 12/962,198 filed Dec. 7, 2010, which is a continuation of U.S. Utility patent application Ser. No. 12/330,200 filed Dec. 8, 2008, now U.S. Pat. No. 7,848,999, which is a continuation of U.S. Utility patent application Ser. No. 09/696,193 filed Oct. 26, 2000 now U.S. Pat. No. 7,464,053, which claims the benefit of U.S. Provisional Patent Application No. 60/161,369 filed Oct. 26, 1999, the entire disclosures of which are incorporated herein by reference.

BACKGROUND OF THE INVENTION

1. Field of the Invention

The invention relates in general to electronic contract applications using electronic information networks, and in particular to a system for electronic contract negotiations which uses the Internet or conventional telephony to facilitate requests for bids (RFB) from potential buyers and issue Conditional Sale Offers (CSO) from sellers which, at the discretion of the buyer, may become Binding Sale Agreements (BSA).

2. Related Art

There are millions of transactions annually in the U.S. alone where the fees are "fixed" because there is little competition due to geography or other factors, or due to the lack of support, or even encouragement, of easy comparisons or negotiations between buyer and seller in the marketplace. Several technologies have arisen to address this general problem.

U.S. Pat. No. 4,903,201 to Wagner discloses a computerized open outcry exchange system for transacting sales of a particular futures commodity contract wherein bids to purchase or offers to sell the particular commodity contract are made through remote terminals and the exchange computer automatically matches offers and bids to complete the transaction.

U.S. Pat. No. 5,794,207 to Walker, et al. discloses a bilateral buyer-driven method of commerce which allows prospective buyers of goods and services to communicate a binding purchase offer globally to potential sellers, for sellers conveniently to search for relevant buyer purchase offers, and for sellers potentially to bind a buyer to a contract based on the buyer's purchase offer.

The system and method disclosed in the '207 patent has certain limitations. One such limitation, particularly from a buyer's point of view, is the potential for a buyer to unknowingly "over-bid"; that is, to bid more than the fair market value had he known the "actual" market price for a product or service.

An example of this particular limitation of the system and method described in the '207 patent is as follows: If one were to offer to pay $1 billion for an airline seat next Tuesday between New York and Washington, D.C., the system and method of the '207 patent would consummate the ticket purchase transaction. It is apparent that a price of $1 billion is an unfair price for the consumer to pay for that airline seat but, because under the system and method of the '207 patent the buyer, in effect, puts money on a "clothesline," the transaction would execute to the detriment of the buyer. The first seller to "pick" the money off the clothesline profits while the unfortunate and unsuspecting buyer suffers by paying such an egregiously unfair price.

As a result, the system described in the '207 patent, allows an unwary buyer to enter into an unfair purchase transaction because there is no open competition and the first seller to accept the over-bid price wins while the buyer loses—the very antithesis of a competitive market. If a buyer is naive enough to unknowingly offer to pay above-market value for a service or product, the lack of fair, open and neutral bidding allows him to be taken advantage of. Therefore, the '207 patent is actually "seller-executed" as opposed to being truly "buyer-driven."

Another limitation of the '207 patent is that it does not permit a buyer to explore 'what-if' scenario's. Once submitted, the buyer is prevented from changing his conditions even slightly to examine how one or more changes might affect the outcome of the offer. For example, under the '207 patent a buyer is irrevocably bound and must accept an offer if it meets the initial conditions the buyer described in its CPO.

U.S. Pat. No. 6,085,169 to Walker, et. al. discloses a management system for receiving CPOs from one or more customers, and for evaluating the received CPOs against a number of CPO rules, to determine whether any seller is willing to accept a given CPO.

The system of the '169 patent is essentially a management system to determine if any single seller will accept an offer from a buyer. A limitation of that system, as in the '207 patent, is the lack of competing sellers' offers presented to the potential buyer for his evaluation before the buyer chooses to accept any offer.

OBJECTS AND SUMMARY OF THE INVENTION

It is therefore an object of the invention to provide an improved system and method for electronic contract negotiations between buyers and sellers.

It is a further object of the invention to provide a system and method for electronic contract negotiation which overcomes the limitations of the prior art.

It is yet a further object of the invention to provide a price-neutral exchange system for buyers and sellers.

It is a further object of the invention to provide an improved electronic system and method for allowing a prospective buyer to specify terms to which such buyer may make a commitment to purchase goods or services, and to obtain non-binding competing prices from vendors of such goods or services.

It is a further object of the invention to provide a system and method that offers buyers the opportunity to explore how changing one or more of the terms to which he would agree to be bound affects the 'quality' of the offers produced without being irrevocably bound to his first overture.

In a preferred embodiment, the invention provides a method and apparatus for effectuating truly buyer-driven and buyer-executed commerce by allowing a buyer to specify minimum quantities he would agree to purchase, and/or minimum qualities he would accept in those quantities, and/or the minimum length of time to which he would agree to be bound to purchase those minimum quantities containing those minimum qualities and/or the maximum price he would pay. That buyer agreement to commit to a maximum price and/or to purchase minimum quantities and/or qualities of goods or services, and/or the length of time he would guarantee his 'purchasing loyalty' in turn, triggers competition among the vendors of that product or service to 'capture' the guaranteed revenue that buyer's business represents for the seller.

Further, the system in its preferred embodiment allows a buyer the ability to explore multiple options and multiple offers by changing one or several of the conditions to which the buyer would agree to be bound, without actually binding himself. The present invention in its preferred embodiment further allows the buyer to "bind" the seller to an offer only after the buyer has evaluated all relevant seller offers.

In addition, the present invention is preferably configured so as not to require personal or financial information to be submitted in advance before a RFB may be entered into the system and executed by the controller, and before CSOs are produced by a truly competitive auction process. Only when a potential buyer desires to accept a CSO and bind a potential seller to its offer must buyers reveal personal or financial information. The option of stripping away the anonymity of the buyer lies exclusively with the potential buyer. Thus, personal anonymity is enhanced by the system. Additionally, allowing a buyer to bind the seller on the back-end of the transaction alleviates buyer concerns regarding whether the RFB is acceptable. Even if the buyer submits an RFB stating the buyer will pay no more than $1 billion for an airline seat between New York and Washington, the reverse-auction conditional sale offers automatically produced in accordance with the system and method of the present invention ensures that truly competitive prices are produced and that the buyer receives the lowest possible price from among a plurality of possible price choices, which may be contained, e.g., in the system database. Thus, the present invention prevents the buyer from suffering the effects of over-bidding.

For sellers, the system and method of the present invention becomes a venue for the electronic "presentation" of thousands of potential new customers weekly, or even daily, all of which may be sold by means of the present invention, allowing sellers to keep sales costs to a minimum and make more profit. Sellers may use the system of the invention without losing any profit margin because the present invention allows sellers to easily calculate the risk versus reward value of a potential customer and thus pre-determine the lowest price for which they are willing to sell their product or service based on the guaranteed commitment of the buyer to purchase a minimum quantity and/or quality over a set or in some cases, an indeterminate length of time.

Other vendor benefits are the ability to efficiently acquire new customers and thus lower sales costs, a guaranteed revenue stream of an agreed-upon number of units for an agreed-upon length of days, weeks, months or years, the ability to subsequently "up-sell" other services to those newly acquired customers and "breakage" on guaranteed but unused units.

Further, because the present system in its preferred embodiment is neutral in execution, it, in essence, levels the playing field among vendors by enabling 'apples to apples' price comparisons based on the buyer's guaranteed commitment and gives industry "underdogs" the ability to quickly and efficiently enhance their market share and acquire tens, even hundreds of thousands of new customers simply by offering a better price than their competitors.

The present invention further provides a price-discovery and/or a quantity-discovery system and a means for a potential buyer to "test the waters" for a product or service with no blind commitment in advance and no personal information required before an RFB can be submitted. Seller responsive offers, but not identities, are thus revealed, whereupon the buyer may evaluate the offers and then change some of his proposed terms and re-submit the RFB to discover how that affects the seller price offers. The net effect is self-defined, predictable bills for services or goods they have electronically contracted to purchase.

The present system and invention gives buyers new powers, including the ability to leverage their personal purchasing power and, in effect, "extort" a better price from a seller in return for their guaranteed purchasing loyalty.

In a preferred embodiment, the system of the present invention includes a controller which permits potential sellers to submit CSOs in advance for "uniform" subject goods or services or to change those prices or terms. The controller stores the CSOs in the system's computer database.

The present invention allows potential buyers conveniently to request from prospective sellers of goods and services a CSO, and also allows potential buyers to bind a seller to a contract based on the seller's offer at which point the CSO becomes a BSA.

In a preferred embodiment of the invention, communications between buyers and sellers are conducted using Web browser-enabled personal computers (PC) operably coupled using an electronic information network such as, but not limited to, the Internet, and a central controller.

In a preferred embodiment of the present invention, potential buyers are able to remain anonymous to the potential sellers even after receiving CSOs. A buyer need not reveal their identify until they wish to bind a seller to a CSO, transforming the CSO into a BSA.

In certain embodiments, the auction process is a "reverse" auction where prices go down. For example, a buyer might guarantee to purchase 1000 minutes (quantity) of 'anytime' (quality) long-distance service every month for 12 months (term) in return for the best per-minute rate. In this example, the buyer might receive offers of 9¢ per minute from seller "A", 7¢ per minute from seller "B", 5¢ per minute from seller "C" and so forth. In other instances, the auction process will cause CSO prices to increase.

As an example in which auction prices rise, a potential buyer may issue a RFB in which in an offer is made to place a $10,000 Certificate of Deposit in a financial institution for 60 months in return for the best interest rate. In such instances as this, the CSO prices offered by potential sellers will increase. For example, after an auction occurs, a potential buyer might be offered a CSO by seller "A" of 7.25%, a CSO by seller "B" of 7.50% and a CSO by seller "C" of 7.75%.

At the end of the auction process, potential buyers "see" the seller's offers, but not the seller's identities and, after submitting their own personal and payment information, the buyer then may accept an offer thus binding the seller to a contract and simultaneously, themselves to the seller.

The method and system of the present invention preferably use the Internet as a transport, but may alternatively utilize conventional communications systems such as voice telephony.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
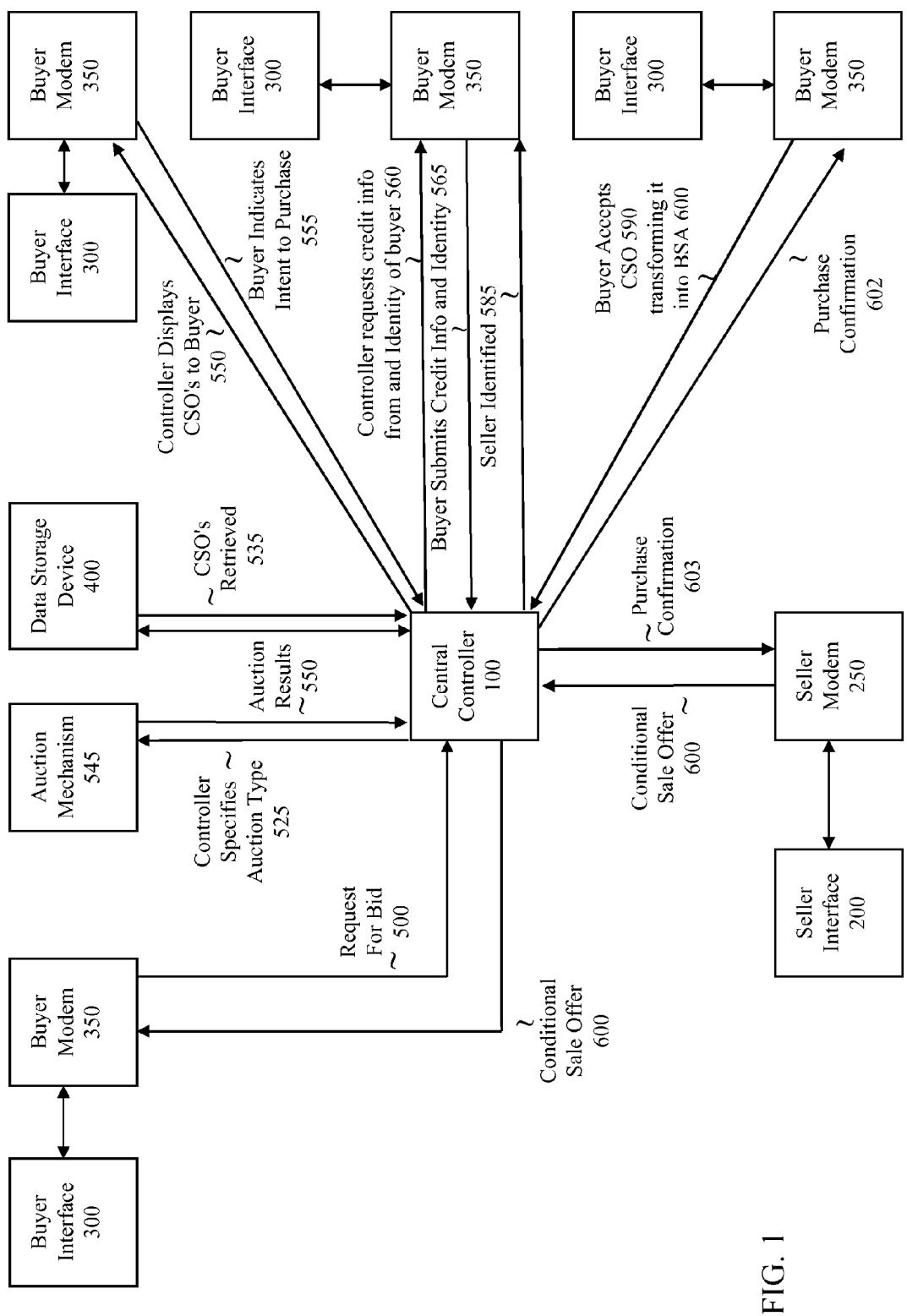
FIG. 1 shows a block diagram illustrating the architecture of the invention in its preferred embodiment.

The method and system of the present invention will now be discussed with reference to FIG. 1. In a preferred embodiment, the present invention includes a central controller 100, seller interface 200, seller modem 250, buyer interface 300, buyer modem 350 and associated databases maintained in data storage device 400. In a preferred embodiment, the central controller preferably comprises a highly scalable and stable platform, such as Sun Solaris servers running Unix with an Oracle database. Other databases useful for practicing the invention include Informix, Microsoft SQL Server, and Sybase. Web servers utilized in accordance with the invention may also comprise, e.g., Apache, iPlanet Web Server Enterprise Edition, Microsoft IIS, or Netscape Enterprise Server. Application servers useful for practicing the invention include, e.g., ATG Dynamo, BEA, WebLogic Server, Bluestone Sapphire/Web, Broadvision, Cold Fusion, Intershop, InterWorld, Lotus Domino, Netscape Application Server, Open Market, Oracle Application Server, Vignette, and WebSphere.

In a preferred embodiment, using the interface of an Internet web browser such as Netscape Navigator™, available from Netscape, Inc., a potential buyer creates a Request for Bid (RFB) 500 by indicating a quantity 1000, quality 2000, term 3000 and/or price 4000 to which he would agree to be bound.

Figure 2:
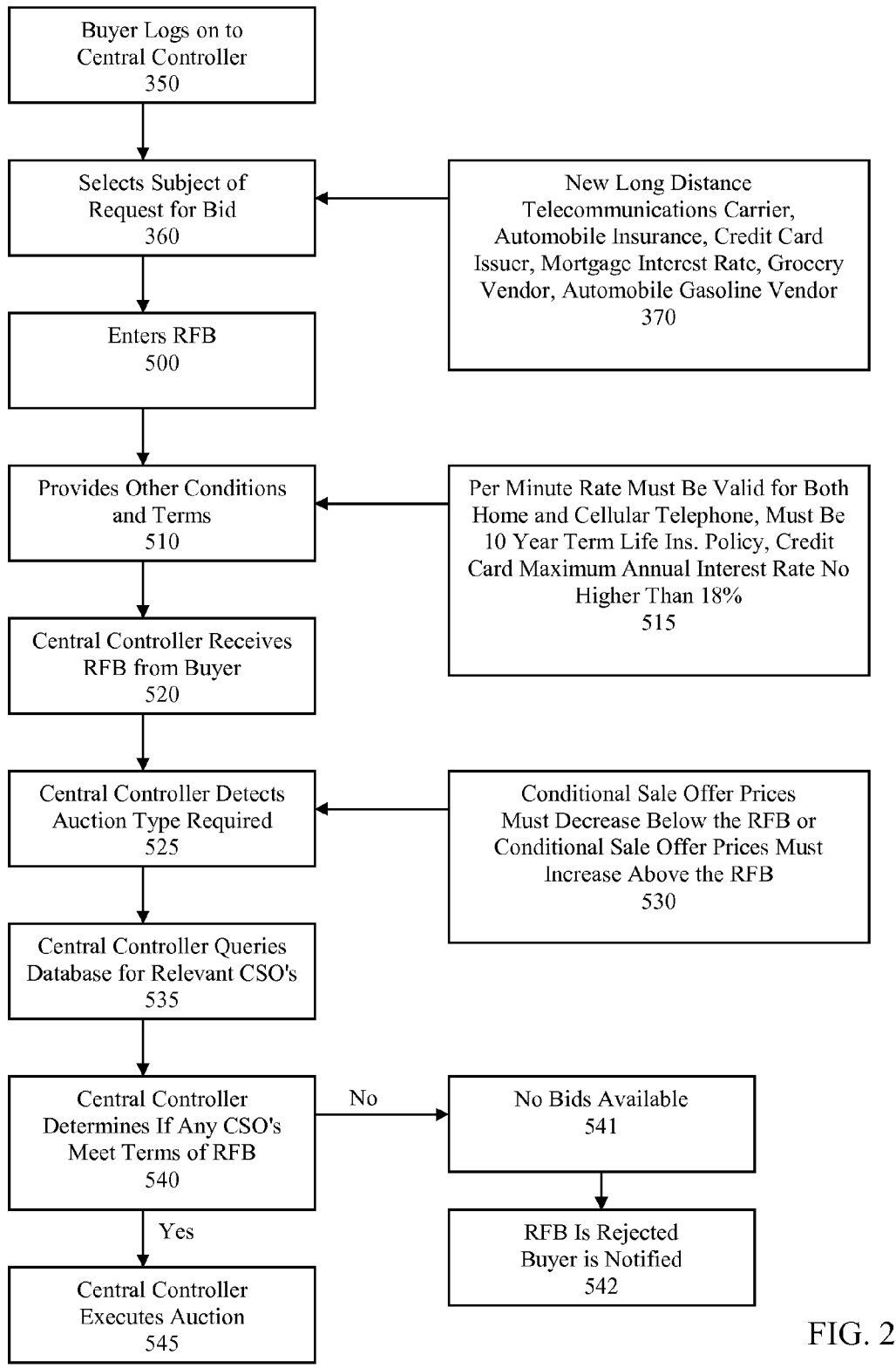
FIGS. 2 and 3 show flow diagrams illustrating how a Request For Bid (RFB) may be generated and executed.
Figure 3:
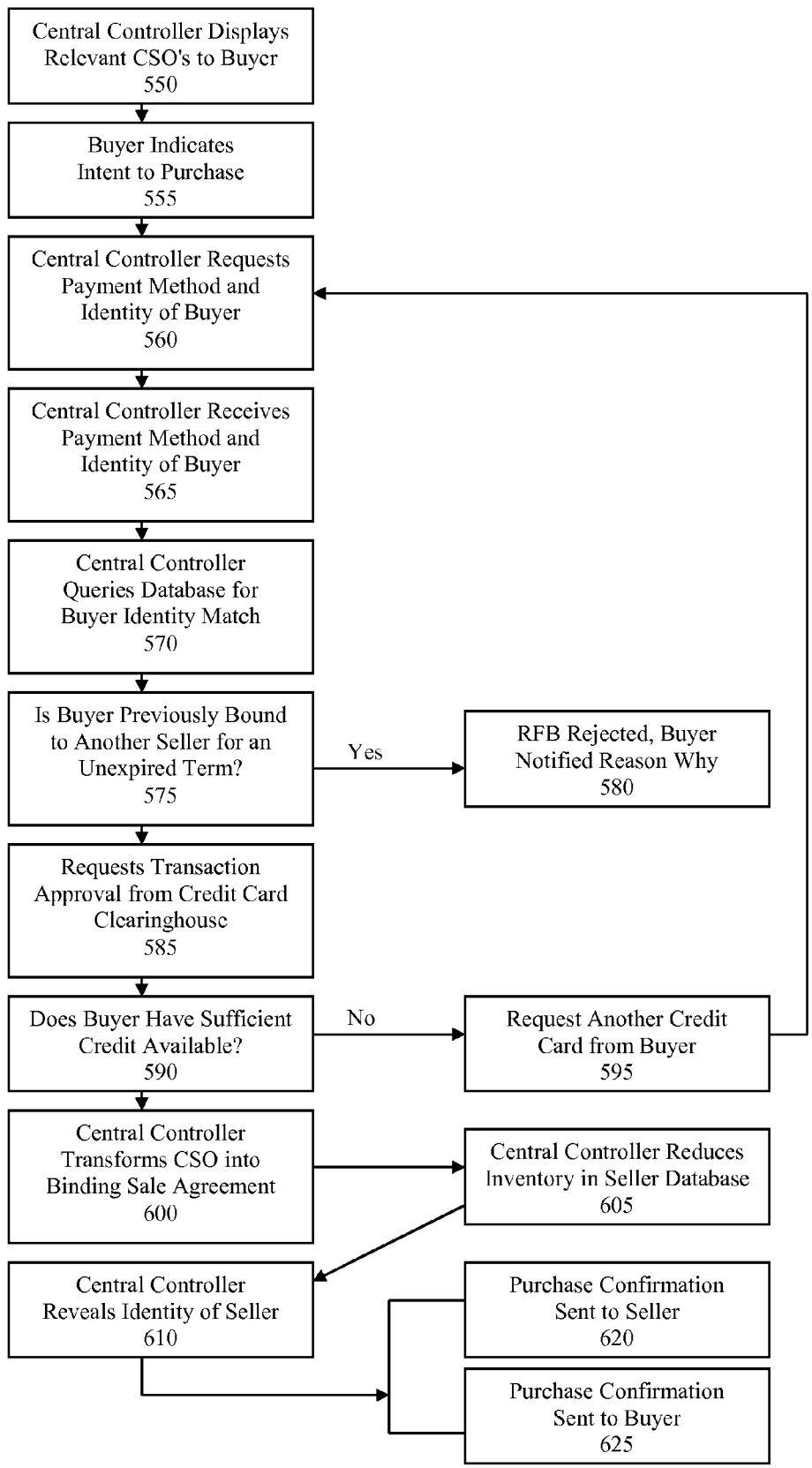

With reference to FIGS. 1, 2 and 3, the present invention, in a preferred embodiment, provides a method and system for communication between buyers and sellers via the Internet, with central controller 100 acting as a web server. The present invention can also be practiced in off-line embodiments. For example, without limitation, buyers may use telephones to create RFBs and potential sellers may use a telephone to browse those RFBs and issue CSOs.

The method of the present invention accordance with its preferred embodiment is illustrated in FIG. 2. The buyer may log on to a central controller, in step 350. The buyer may then select the subject of the RFB, in step 360; for example, switch to a new telecommunications carrier, purchase a new automobile insurance policy, select a credit card issuer, choose a Mortgage interest rate, in step 370. The buyer enters an RFB, in step 500, specifying the minimum guarantees the buyer is willing to make to the seller if the seller meets the buyer's terms, in step 510; for example, the buyer agrees to purchase a minimum of 500 minutes of long distance service per month from the seller (quantity 1000), or that those long distance minutes must be able to be utilized at any time during any 24-hour period (quality 2000), or that the buyer is willing to be bound to the seller for a minimum of 24 months (term 3000), or that the maximum price he will pay is $50, in step 515. Buyer may specify all four conditions (quantity 1000, quality 2000, term 3000, price 4000) or any combination thereof to which he would agree to be bound or none of the conditions. Central controller receives RFB, in step 520, detects the type of auction required—whether an increasing or decreasing auction—in step 525; for example, CSO price or rate must increase above the price or rate named in the RFB, such as a bank must offer an interest rate at least 6%—or CSO prices must decrease below the price quoted in the RFB, such as a lower per minute rate for long distance services, in step 530, retrieves appropriate seller CSO data, in step 535, stored in a database (Element 400), determines if any relevant CSOs exist in step 540, and if so, executes the auction, in step 545, and displays the results for viewing by the potential buyer, in step 550 in FIG. 3. If no relevant CSOs exist, step 541, that can meet or exceed the conditions of the RFB, the buyer is so informed via the web browser, in step 542.

With reference to FIG. 3, after the buyer indicates an intent to bind a seller to its CSO, in step 555, the central controller (Element 100) requests payment method and identity of the potential buyer, in step 560, and after receiving the personal identity and financial payment method, in step 565, queries its database in step 570 to verify this same buyer has not previously bound himself to another seller of these same goods or services for a term which has not yet expired, step 575, and if so rejects the buyer's RFB in step 580, but if not requests merchant approval code for the transaction from credit card clearinghouse, in step 585, verifies potential buyer has sufficient credit available, in step 590, requests another credit card if credit is insufficient, in step 595, transforms RFB into a binding CSO between buyer and seller, step 600, debits seller inventory, in step 605, reveals identity of seller to buyer in step 610, and sends sale confirmation to the seller, in step 620, and buyer, in step 625.

As demonstrated above, the present invention provides better anonymity to both potential buyers and sellers. Under the system and method of the present invention, only the most benign information from the potential buyer is required to produce an RFB and initiate the auction process. The anonymity provided by the present invention serves to make it substantially more "buyer-friendly" and, thereby, more desirable as a method of conducting business than under prior systems and methods.

Another feature of the preferred embodiment is that, even after the potential buyer names the minimum quantities, qualities, term or price to which he would agree to be bound in the RFB, the buyer is not required to "blindly" commit, in advance, to accept any of the subsequent offers received even if one or more of those offers match precisely the requirements of the buyer's RFB. The buyer chooses whether and when to bind the seller to an offer, thus making this system truly buyer-driven and buyer-executed. This is an advantage to buyers or users of the present invention over the system and method described in the '207 patent. Another advantage of the present system and method is because it requires the buyer to bind the seller before any purchase-agreement is consummated, the buyer is permitted to explore "what-if" scenarios whereby he may repeatedly change any or all of the proposed conditions to understand how those conditional changes affect the CSOs presented by the sellers.

Figure 4:
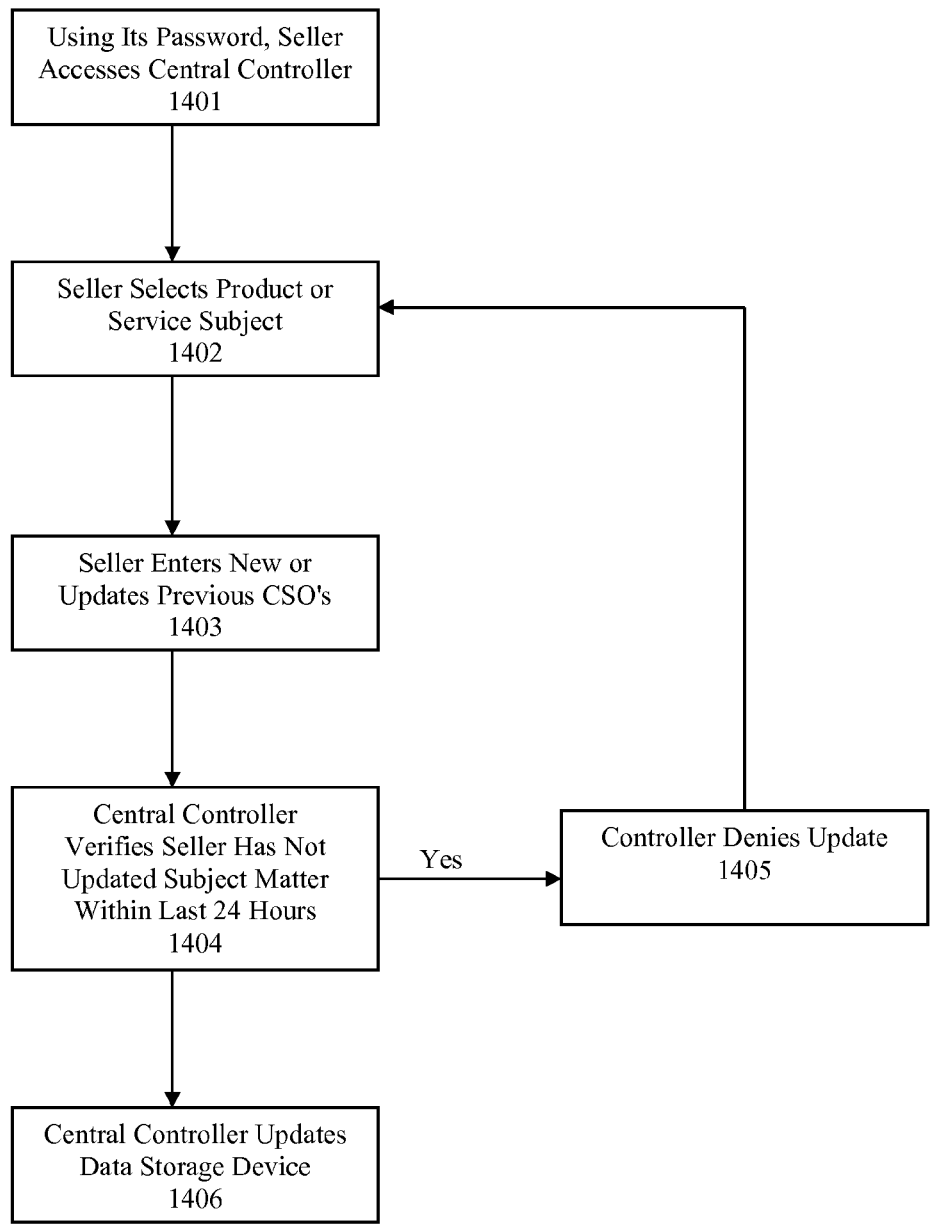
FIG. 4 is a block diagram illustrating how a seller updates prices, terms and availability of its Conditional Sale Offers.

With reference to FIG. 4, there is described another embodiment of the present invention under which potential sellers may enter into the database of the central controller (Element 100) variable service or product prices which correspond directly to the minimum quantity, quality of service, length of time or price the buyer would agree to be bound. Using their password, in step 1401, seller have the ability to log into the "secure" server, select the product or service subject, in step 1402, and update their Good, Better and Best CSOs, quantities or availability, in step 1403. The central controller 100 then verifies that the price of the subject matter as it directly corresponds to quantity, quality and term has not been updated by seller within the last 24 hours, in step 1404, and if so denies seller the ability to change its CSO, step 1405, but if not, updates database, in step 1406. Because of the password-protected feature of the server, no seller or company employee, other than the authorized or original seller, will be able to know what another seller is bidding for a product or service. Because of the 24-hour 'embargo' against updating a CSO that was already updated within the last 24 hours, a seller is prevented from discovering a competitor's CSO for the same subject matter and then marginally bettering his competitor's price so as to produce the 'best' CSO.

Figure 5:
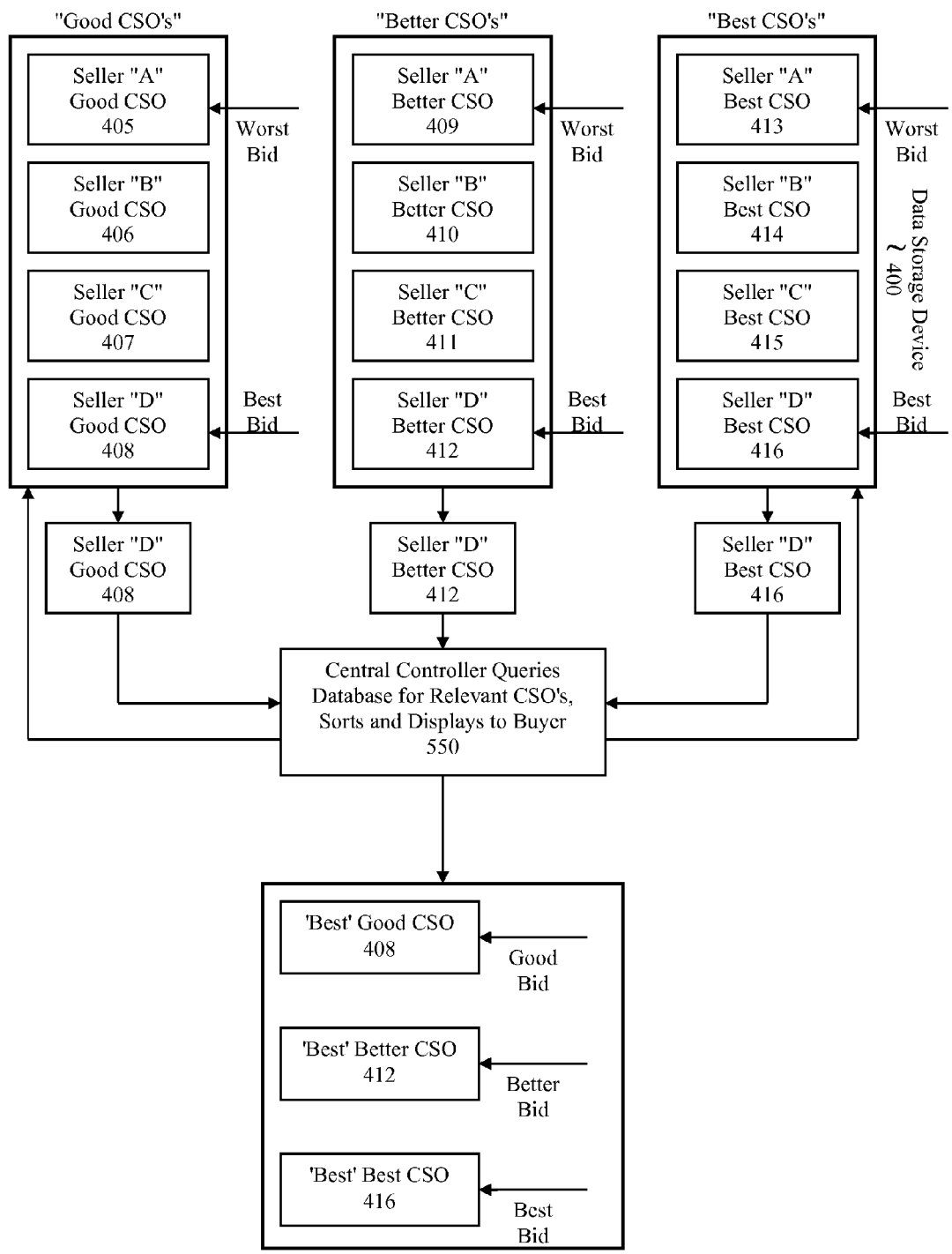
FIG. 5 shows a diagram illustrating how Good, Better and Best CSOs may be generated, sorted and displayed to a buyer in accordance with the invention.

With reference to FIG. 5, once the auction process of the present invention is initiated by a valid RFB, there is described how the central controller (Element 100) queries the database storage device (Element 400) for relevant CSOs. The central controller (Element 100) then uses simple mathematical logic to sequentially process and rank each seller's "Good" CSO, in step 405, against a competing seller's "Good" CSO price, in steps 406, 407 and 408, stepping down, or up, as the case may be, through each successive competing "Better" CSO price, in steps 409, 410, 411 and 412, and "Best" CSOs, in steps 413, 414, 415 and 416, of potential sellers.

The process continues, until the system detects a closing trigger for the auction. At the conclusion of the bidding logic, the Central Controller (Element 100) will sort, rank and display to the potential buyer the three lowest relevant CSOs in step 550.

Figure 6:
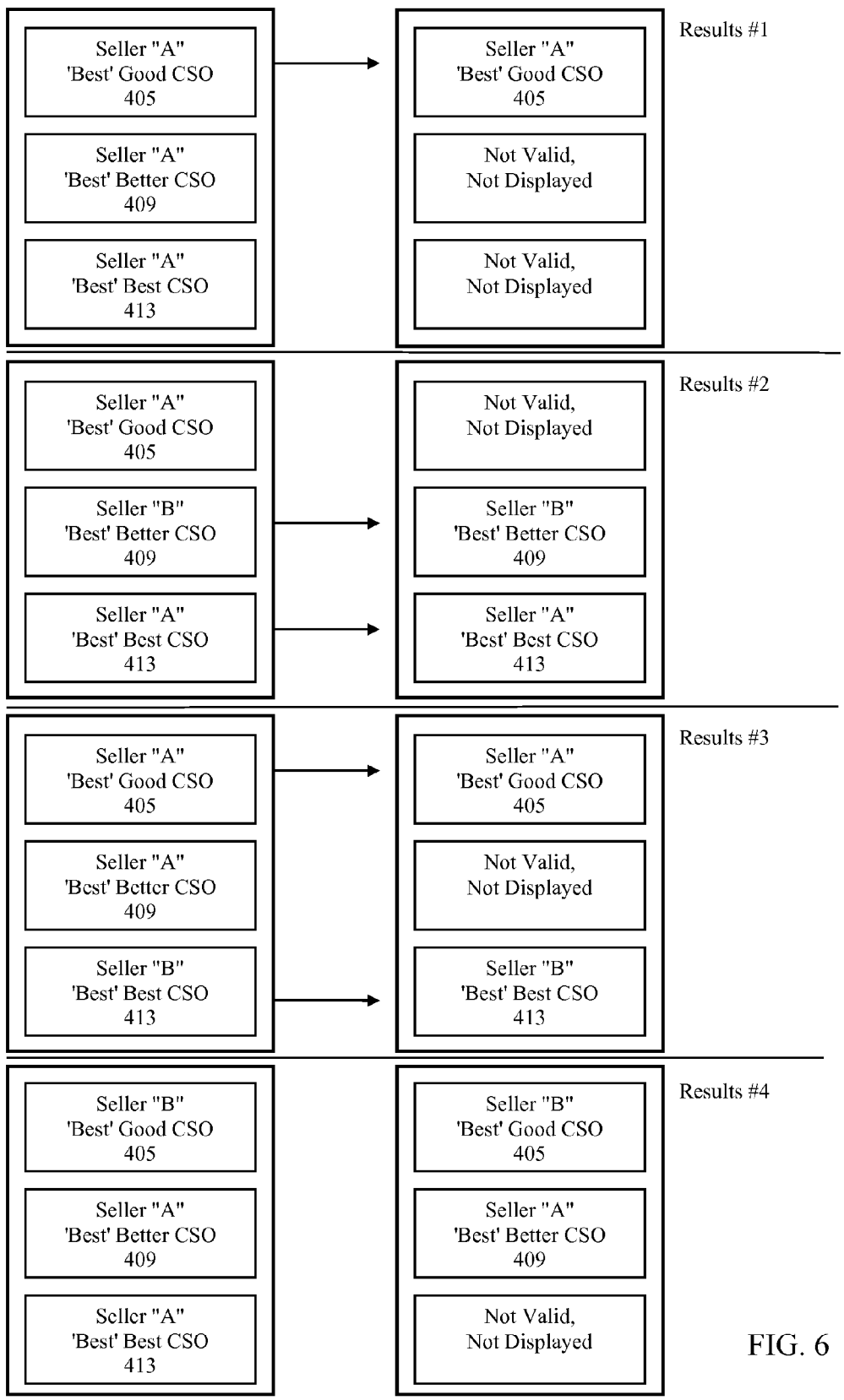
FIG. 6 shows a diagram illustrating how the controller displays to a potential buyer four different results of a seller's 'minimum necessary to win or minimum losing' Good, Better and Best CSO.

With reference to FIG. 6, there is described four examples of another embodiment of the present system which only displays a seller's Good, Better or Best CSO when it is required to 'beat' a competitor's CSO. This prevents a seller from offering a CSO that is not necessary to surpass a competitor's CSO, thus allowing a seller to reap a greater profit from the transaction.

For example, seller A might offer 500 minutes of monthly long-distance telecommunications service (quantity), usable anytime of the day (quality), guaranteed to be purchased by the buyer for a term of 12 months (term), for a Good CSO price of 8¢ per minute, a Better CSO price of 7¢ per minute and a Best CSO price of 6¢ per minute. Seller B might offer the precise same conditions for a Good CSO price of 10¢ per minute, a Better CSO price of 5¢ per minute and a Best CSO price of 4¢ per minute. Though seller B "lost" the bidding at the Good CSO price level (8¢ vs. 10¢), it's Better CSO price of 5¢ per minute beats seller A's Best CSO price of 6¢ per minute and thus seller B's Best CSO of 4¢ per minute is not required in order to be the 'winning' CSO and thus will not be offered, or revealed.

Figure 7:
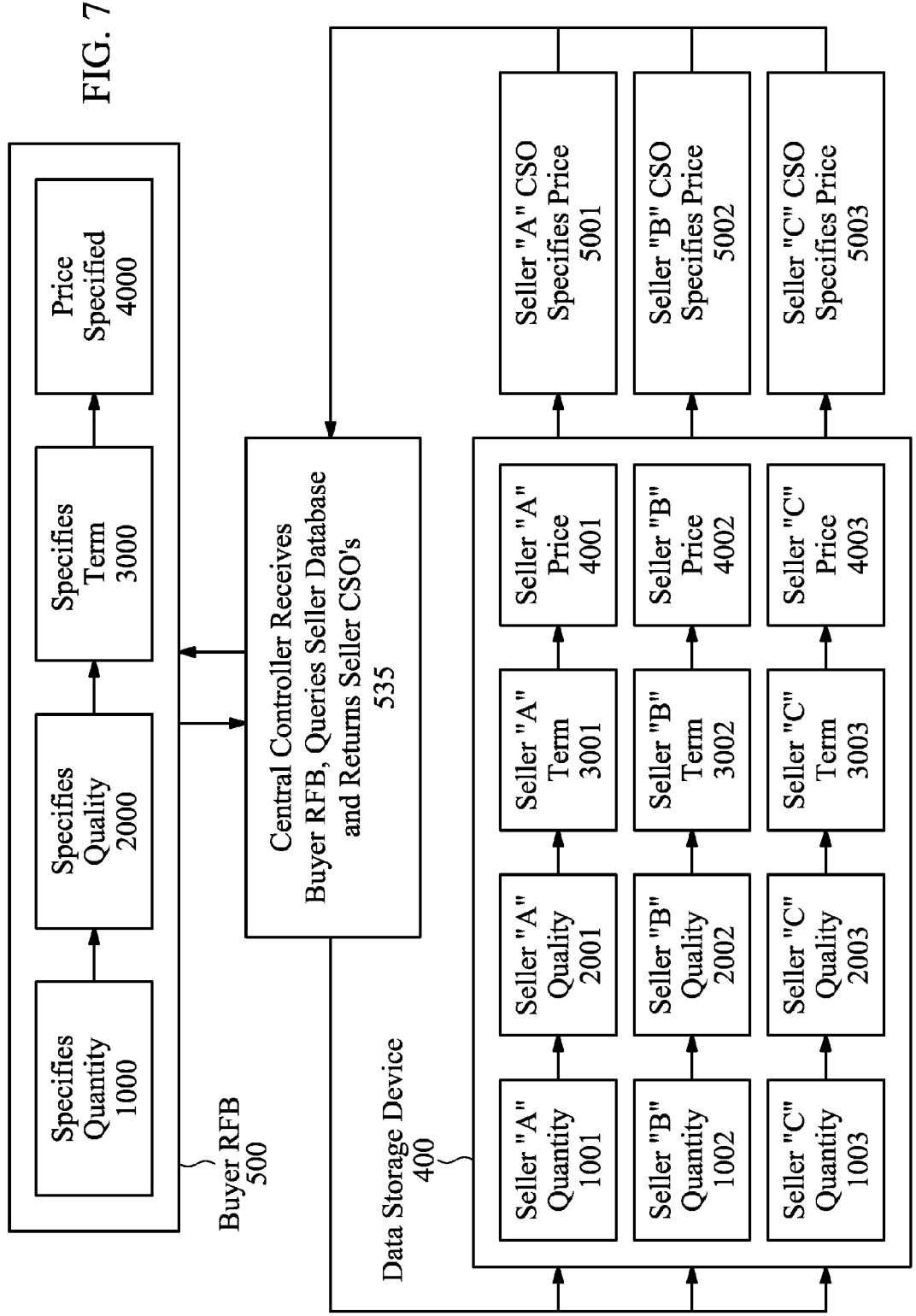
FIG. 7 shows a diagram illustrating how the controller displays results where the buyer has specified the quantity, quality, and terms (but not price) to which he would be bound.

With reference to FIG. 7, there is described a preferred embodiment of the method of the present invention, under which a potential buyer specifies the quantity 1000 of product or service he wishes to contract to purchase, the quality 2000 of product or service he wishes to contract to purchase and the term 3000 to which he would agree to be bound, but not the price 4000 which, in this example, requires the Central Controller 100 to query its Data Storage Device (Element 400) for relevant seller CSOs which specify price 4000 only, as the buyer has already specified the contractual Quantity, Quality of the service or product and the Term to which the buyer would agree to be bound.

Figure 8:
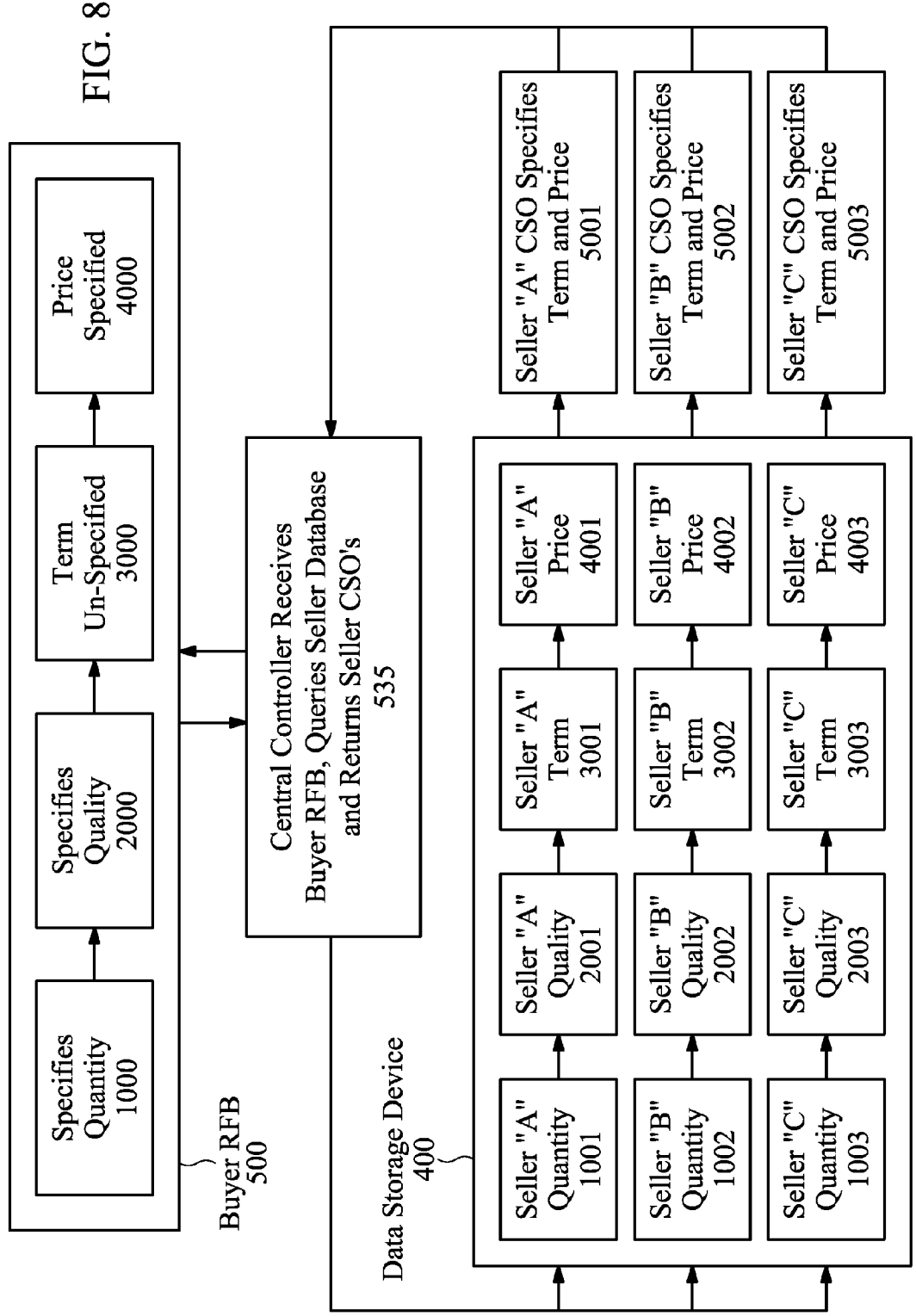
FIG. 8 shows a diagram illustrating how the controller displays results where the buyer has specified the quantity and quality but not the term or the price to which he would be bound.

Referring now to FIG. 8, there is described a preferred embodiment of the method of the present invention under which a potential buyer specifies the quantity 1000 and the quality 2000 of the product or service he wishes to contract to purchase but not the term 3000 or the price 4000 to which he would agree to be bound. Central Controller 100 queries Data Storage Device (Element 400) for relevant seller CSOs which specify the term 3000 and price 4000 to which the buyer would be bound where the quantity 1000 and quality 2000 of the product or service are already specified by buyer.

Figure 9:
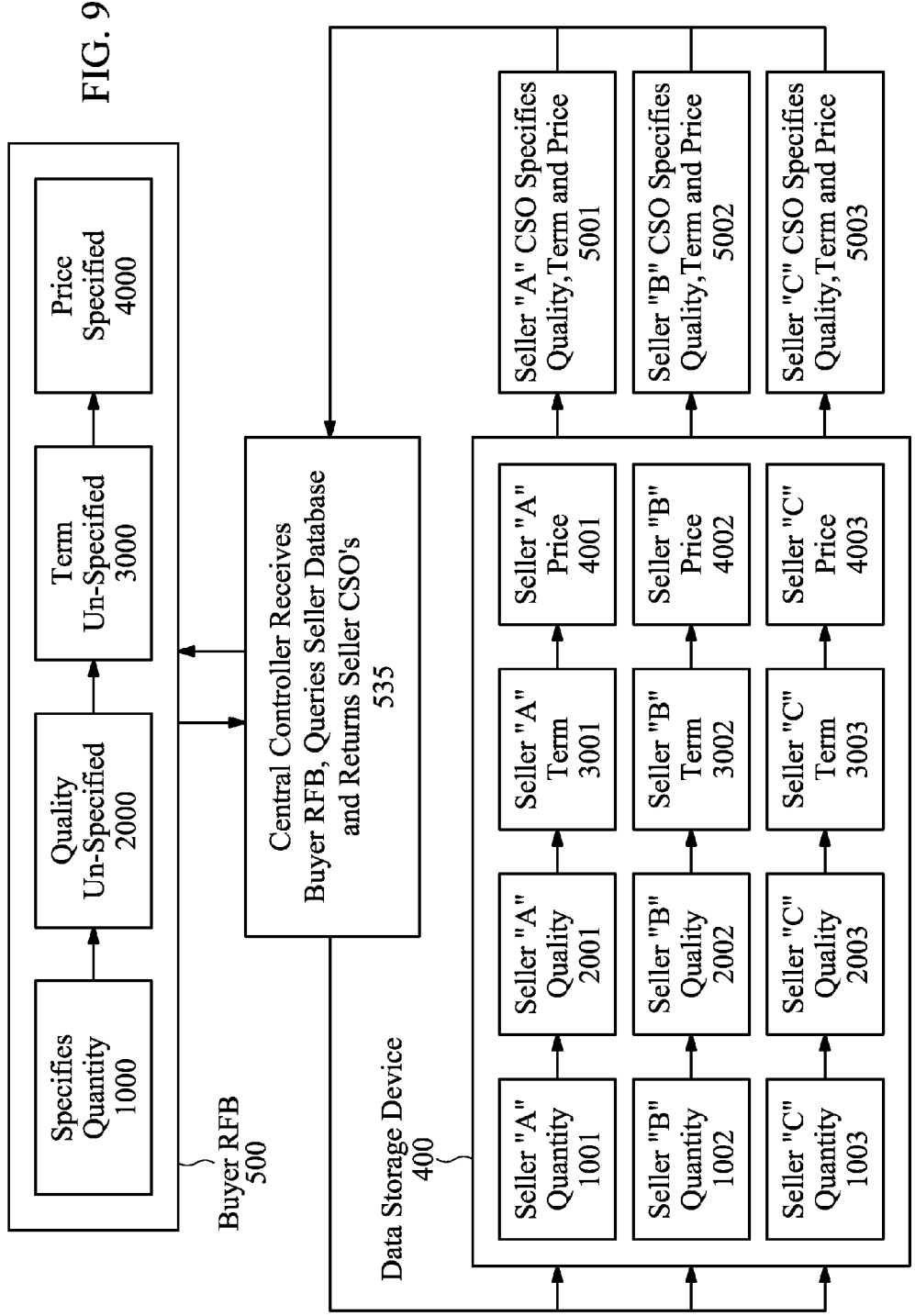
FIG. 9 shows a diagram illustrating how the controller displays results where the buyer has specified the quantity but not the quality term or price to which he would be bound.

Referring now to FIG. 9, there is described a preferred embodiment of the method of the present invention under which a potential buyer specifies the quantity 1000 but not the quality 2000 of the product or service he wishes to buy or the term 3000 or price 4000 to which he would agree to be bound. Central Controller 100 queries Data Storage Device (Element 400) for relevant seller CSOs which specify the quality 2000 of the product and service, term 3000, and the price 4000 to which he would agree to be bound where the quantity 1000 of the product or service is already specified by buyer.

Figure 10:
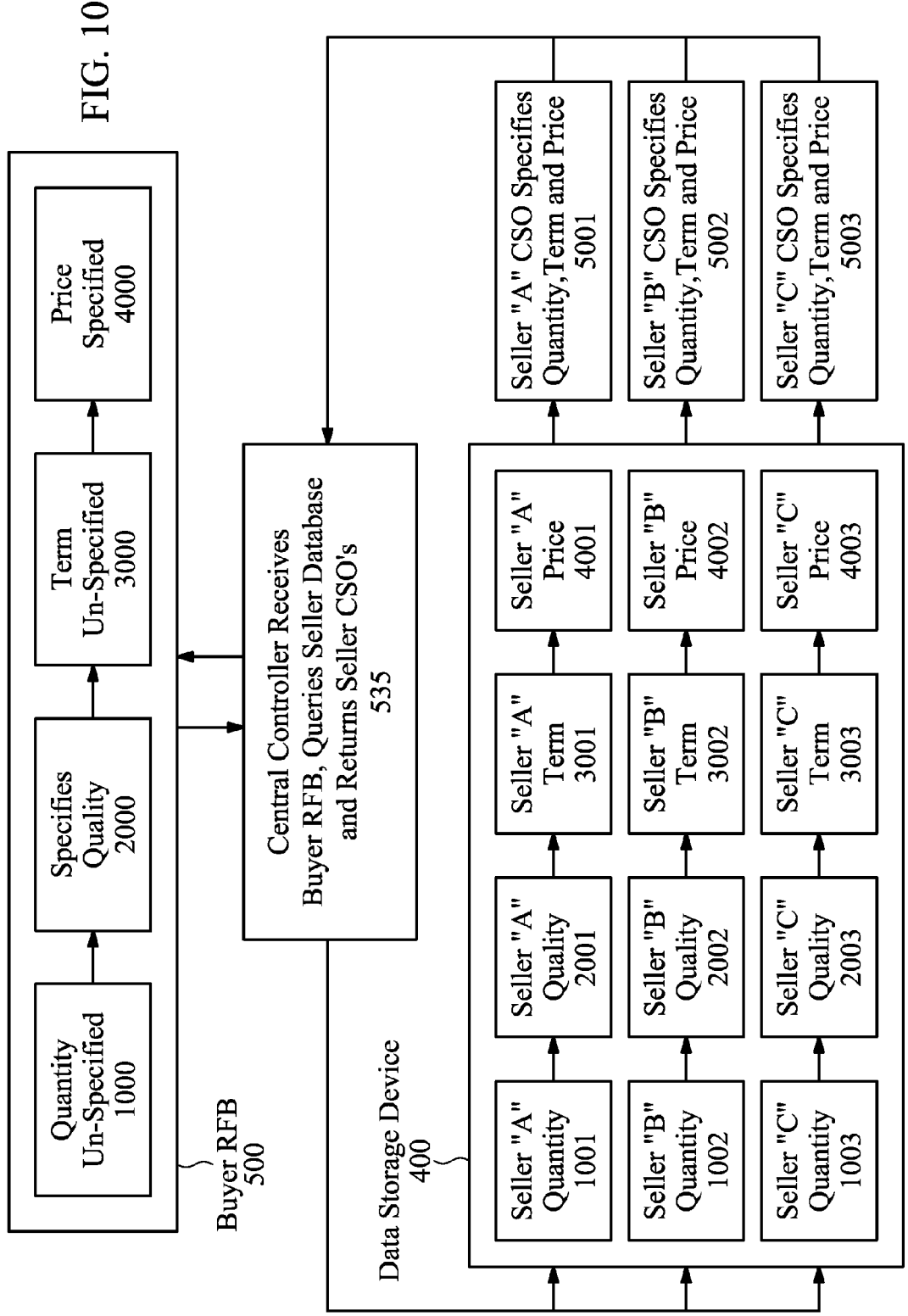
FIG. 10 shows a diagram illustrating how the controller displays results where the buyer has specified the quality but not the quantity, term or price to which he would be bound.

Referring now to FIG. 10, there is described a preferred embodiment of the method of the present invention under which a potential buyer specifies the quality 2000 but not the quantity 1000 of the product or service he wishes to buy or the term 3000 or the price 4000 to which he would agree to be bound. Central Controller 100 queries Data Storage Device (Element 400) for relevant seller CSOs which specify the quantity 1000 of the product or service, the term 3000 and the price 4000 to which he would be bound where the quality 2000 of the product or service is already specified by buyer.

Figure 11:
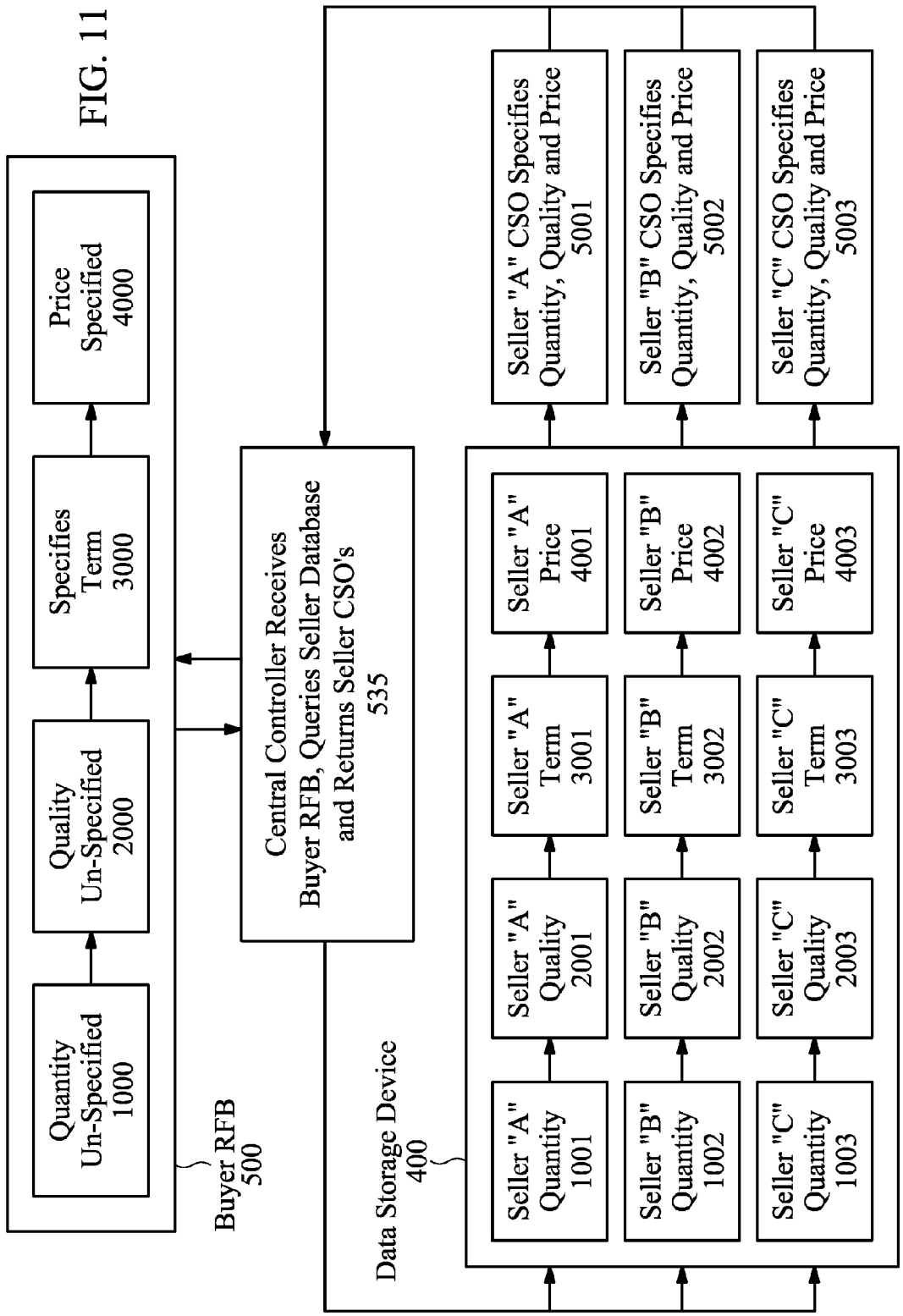
FIG. 11 shows a diagram illustrating how controller displays results where the buyer has specified the term but not the quantity, quality or price to which he would be bound.

Referring now to FIG. 11, there is described a preferred embodiment of the method of the present invention under which a potential buyer specifies the term 3000 to which he would agree to be bound but not the quantity 1000, quality 2000, or price 4000 of the product or service. Central Controller 100 queries Data Storage Device (Element 400) for relevant seller CSOs which specify the quantity 1000, quality 2000 and price 4000 of product or service where term 3000 to which the buyer would be bound is already specified by buyer.

Figure 12:
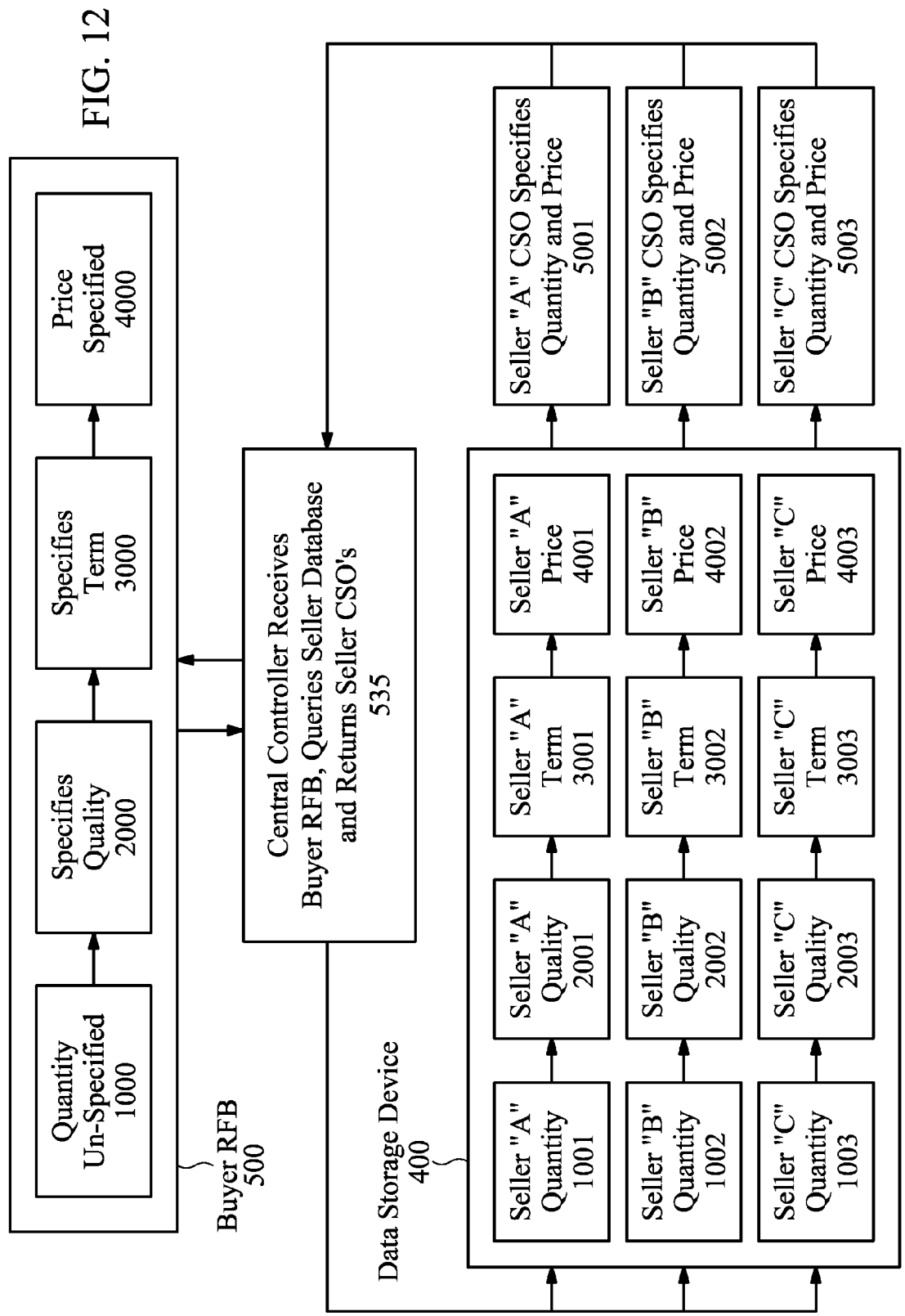
FIG. 12 illustrates a preferred embodiment showing how controller displays results where the buyer has specified the quality and term but not the quantity, or price to which he would be bound.

Referring now to FIG. 12, there is described a preferred embodiment of the method of the present invention under which a potential buyer specifies the quality 2000 of the product or service and the term 3000 to which he would agree to be bound but not the quantity 1000, or price 4000 of the product or service. Central Controller 100 queries Data Storage Device (Element 400) for relevant seller CSOs which specify the quantity 1000 and price 4000 of the product or service where the quality 2000 of the product or service and the term to which the buyer would agree to be bound 3000 are already specified by buyer.

Figure 13:
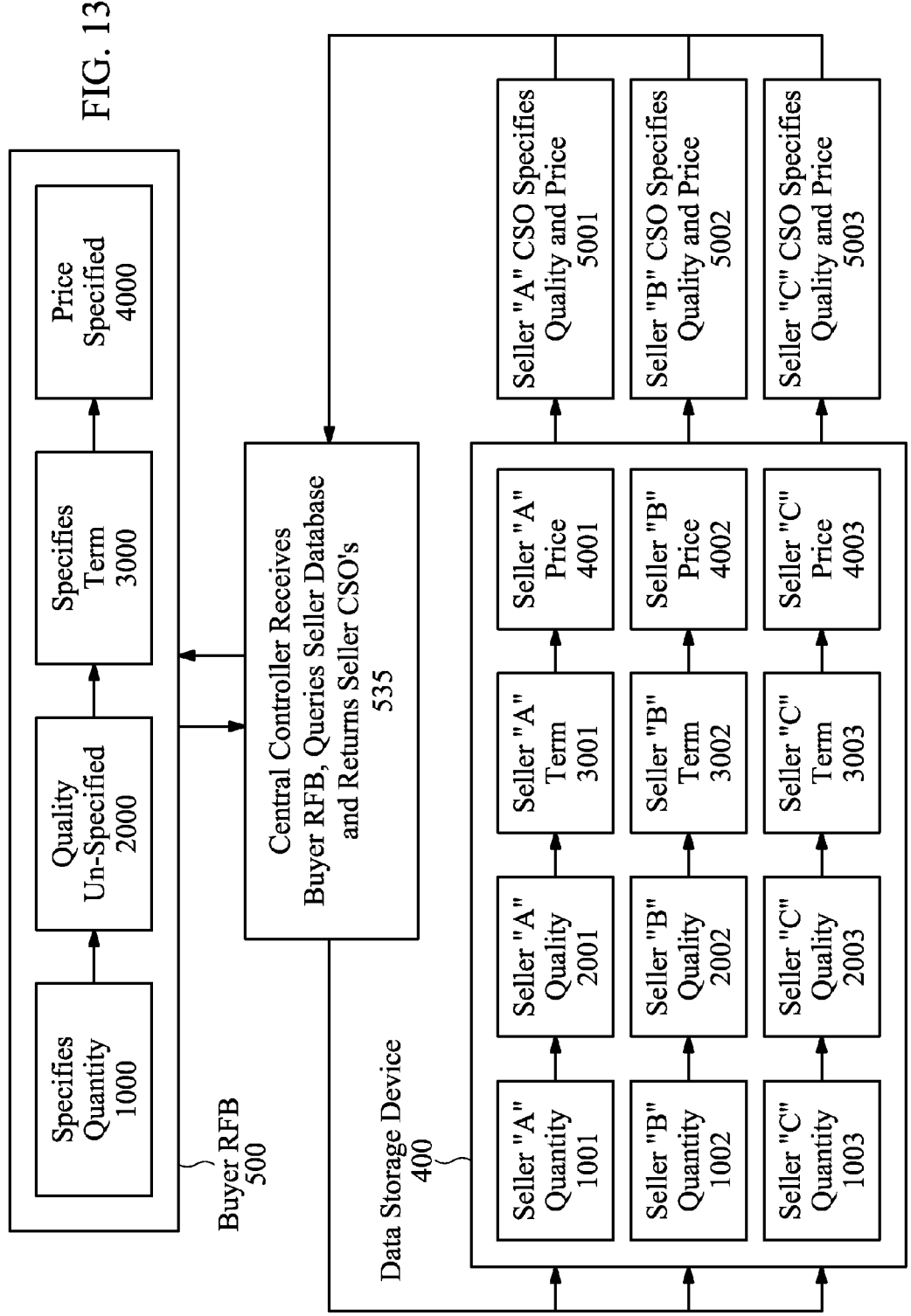
FIG. 13 shows a diagram illustrating how the controller displays results where the buyer has specified the quantity and term but not the quality or price to which he would be bound.

Referring now to FIG. 13, there is described a preferred embodiment of the method of the present invention under which a potential buyer specifies the quantity 1000 but not the quality 2000 of the product or service, the term 3000 or the price 4000 to which he would agree to be bound. Central Controller 100 queries Data Storage Device (Element 400) for relevant seller CSOs which specify the quality 2000 of the product or service and the price 4000 where the quantity 1000 of the product or service and term 3000 to which the buyer would agree to be bound are already specified by buyer.

Figure 14:
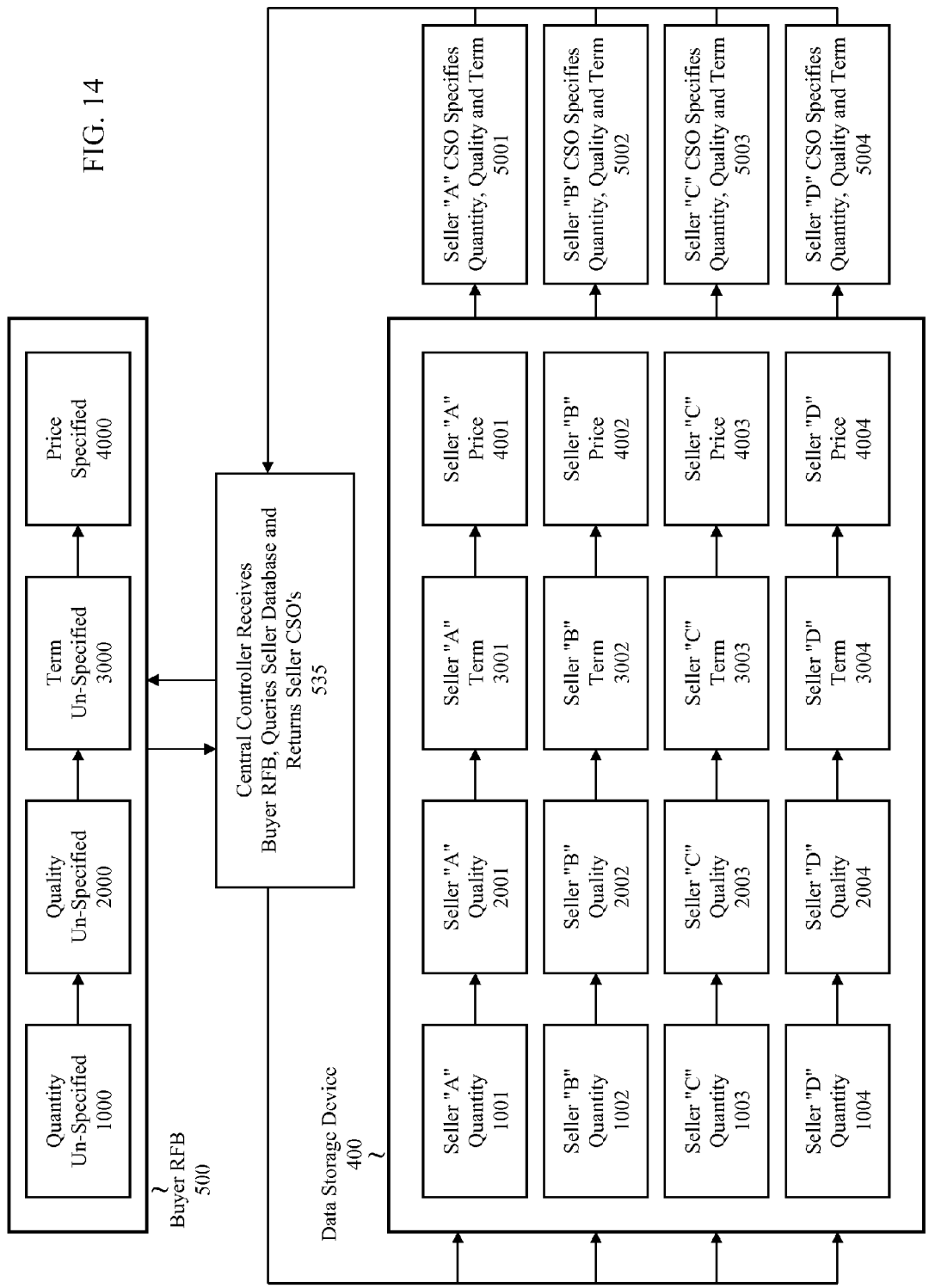
FIG. 14 shows a diagram illustrating how the controller displays results where the buyer has specified the price but not the quantity, quality or term to which he would be bound.

Referring now to FIG. 14, there is described a preferred embodiment of the method of the present invention under which a potential buyer specifies the price 4000 but not the quantity 1000, quality 2000 of the product or service, term 3000, or price 4000 to which he would agree to be bound. Central Controller 100 queries Data Storage Device (Element 400) for relevant seller CSOs which specify the quantity 1000, quality 2000 of the product or service and the term 3000 to which the buyer would agree to be bound where the price 4000 of the product or service to which the buyer would agree to be bound is already specified by buyer.

Figure 15:
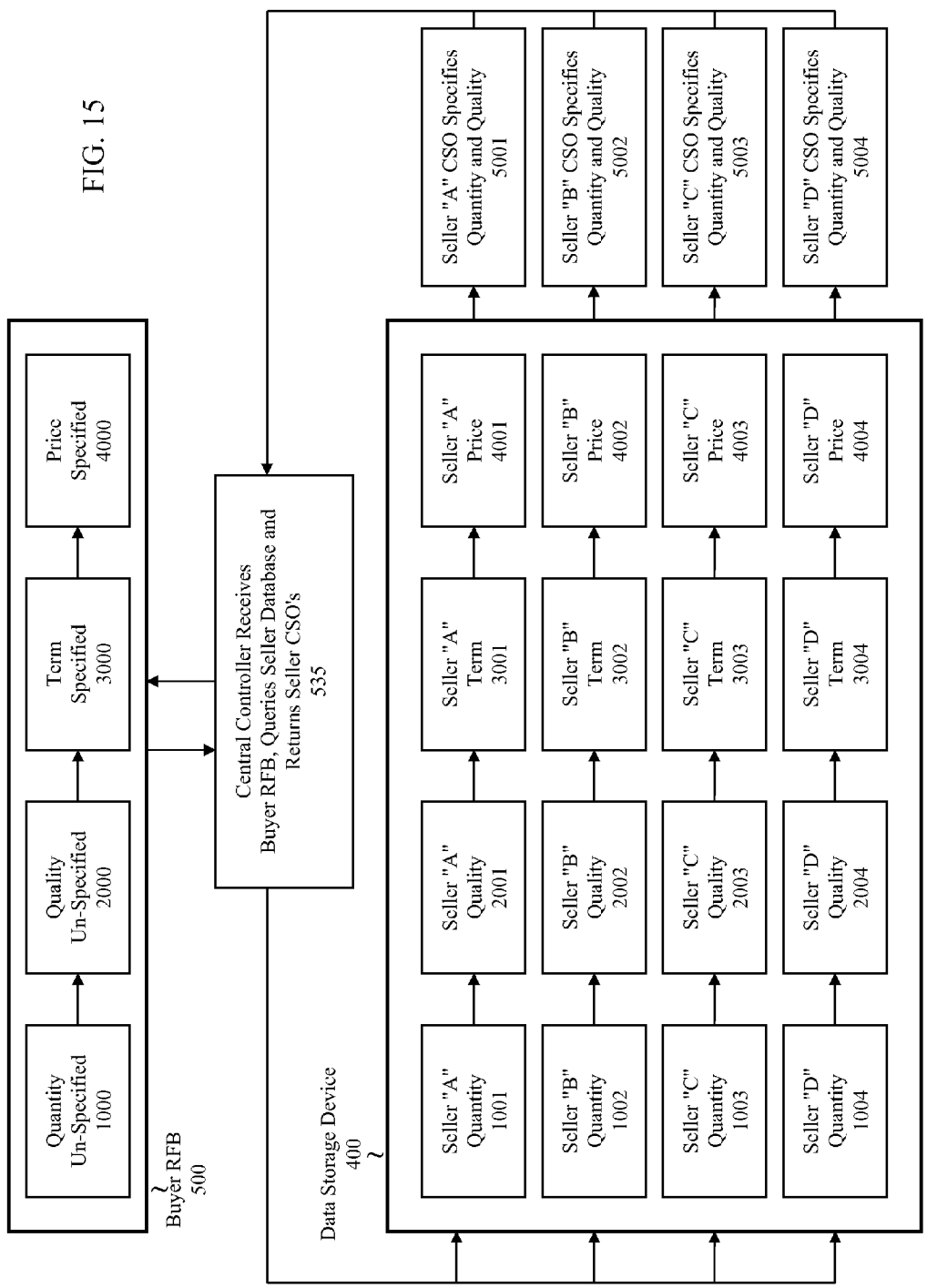
FIG. 15 shows a diagram illustrating how controller displays results where the buyer has specified the term and the price but not the quantity or quality to which he would be bound.

Referring now to FIG. 15, there is described a preferred embodiment of the method of the present invention under which a potential buyer specifies the term 3000 and price 4000 but not the quantity 1000 or quality 2000 of the product or service to which he would agree to be bound. Central Controller 100 queries Data Storage Device (Element 400) for relevant seller CSOs which specify the quantity 1000 and quality 2000 of the product or service where the term 3000 and price 4000 of the product or service to which the buyer would agree to be bound are already specified by buyer.

Figure 16:
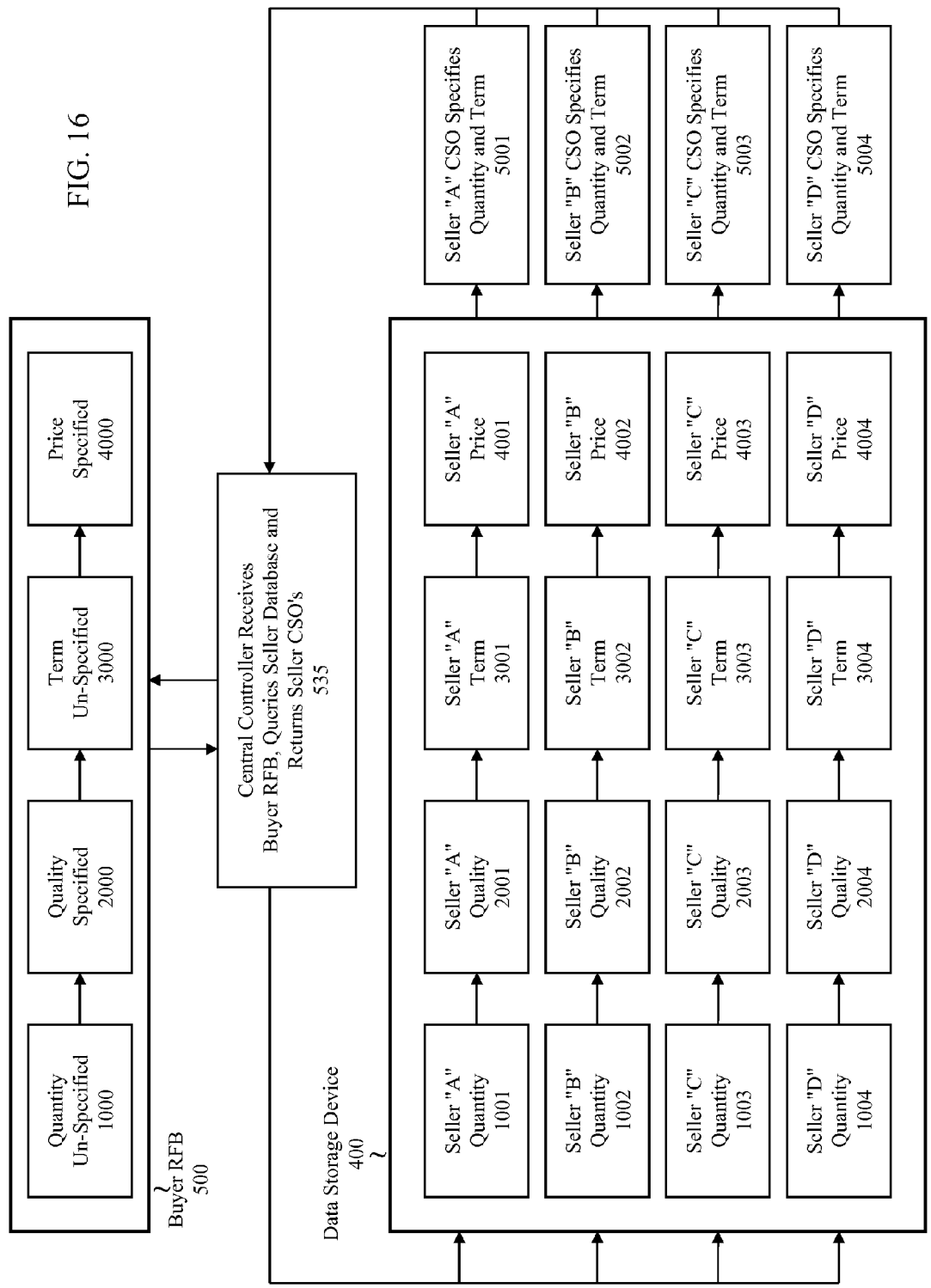
FIG. 16 shows a diagram illustrating how the controller displays results where the buyer has specified the quality and price but not the quantity or term to which he would be bound.

Referring now to FIG. 16, there is described a preferred embodiment of the method of the present invention under which a potential buyer specifies the quality 2000 and price 4000 but not the quantity 1000 of the product or service or the term 3000 to which he would agree to be bound. Central Controller 100 queries Data Storage Device (Element 400) for relevant seller CSOs which specify the quantity 1000 of the product or service and the term 3000 where the quality 2000 and price 4000 of the product or service to which the buyer would agree to be bound are already specified by buyer.

Figure 17:
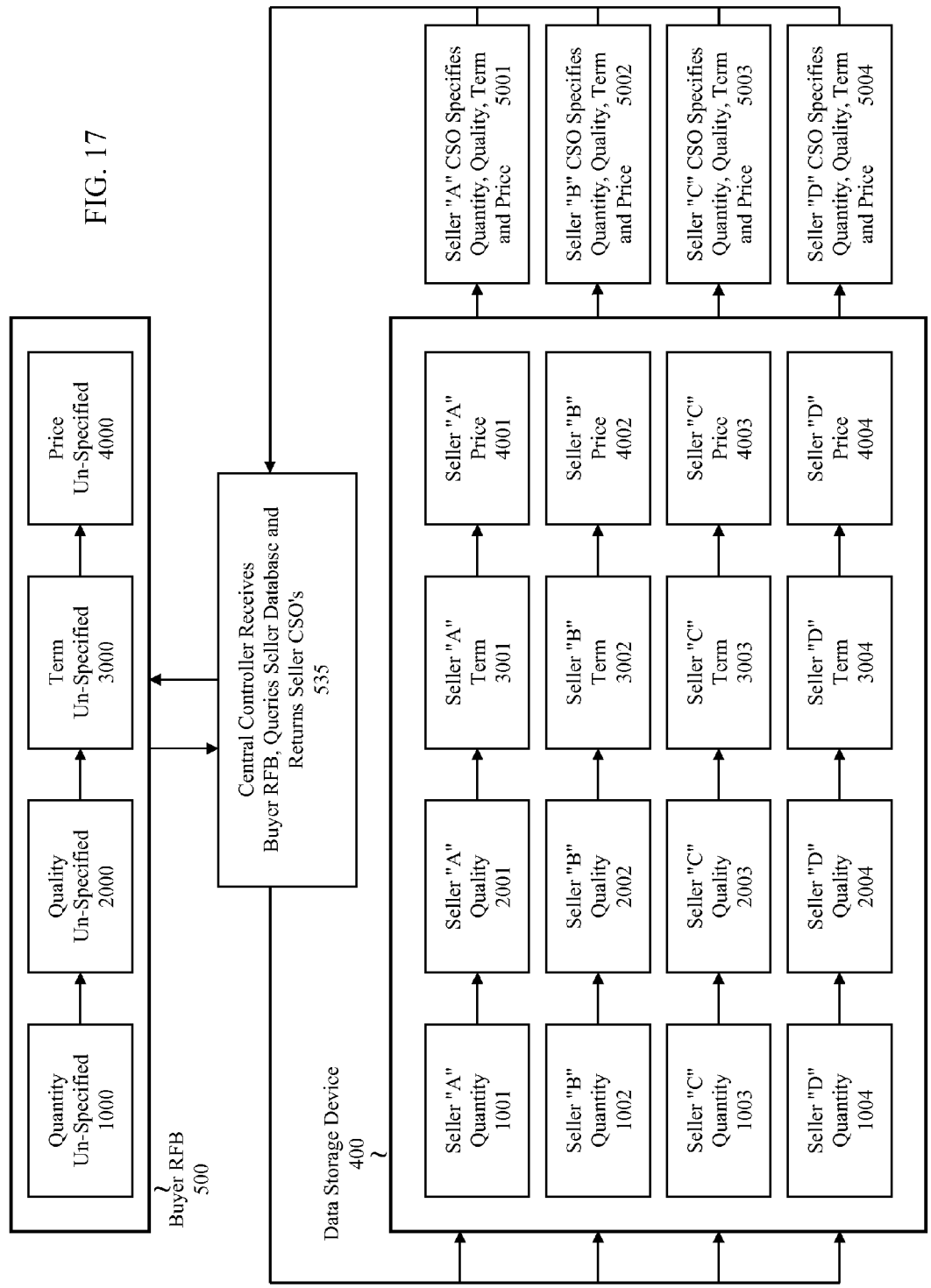
FIG. 17 illustrates a preferred embodiment showing how controller displays results where the buyer has not specified either the quantity, quality term or price to which he would be bound.

Referring now to FIG. 17, there is described a preferred embodiment of the method of the present invention under which a potential buyer does not specify either the quantity 1000, quality 2000 of the product or service, the term 3000, or the price 4000 to which he would agree to be bound—but only his willingness to be so bound. Central Controller 100 queries Data Storage Device 400 for relevant seller good CSOs which specify the minimum seller acceptable quantity 1000, quality 2000 of the product or service, term 3000 and price 4000 to which the buyer would agree to be bound.

Figure 18:
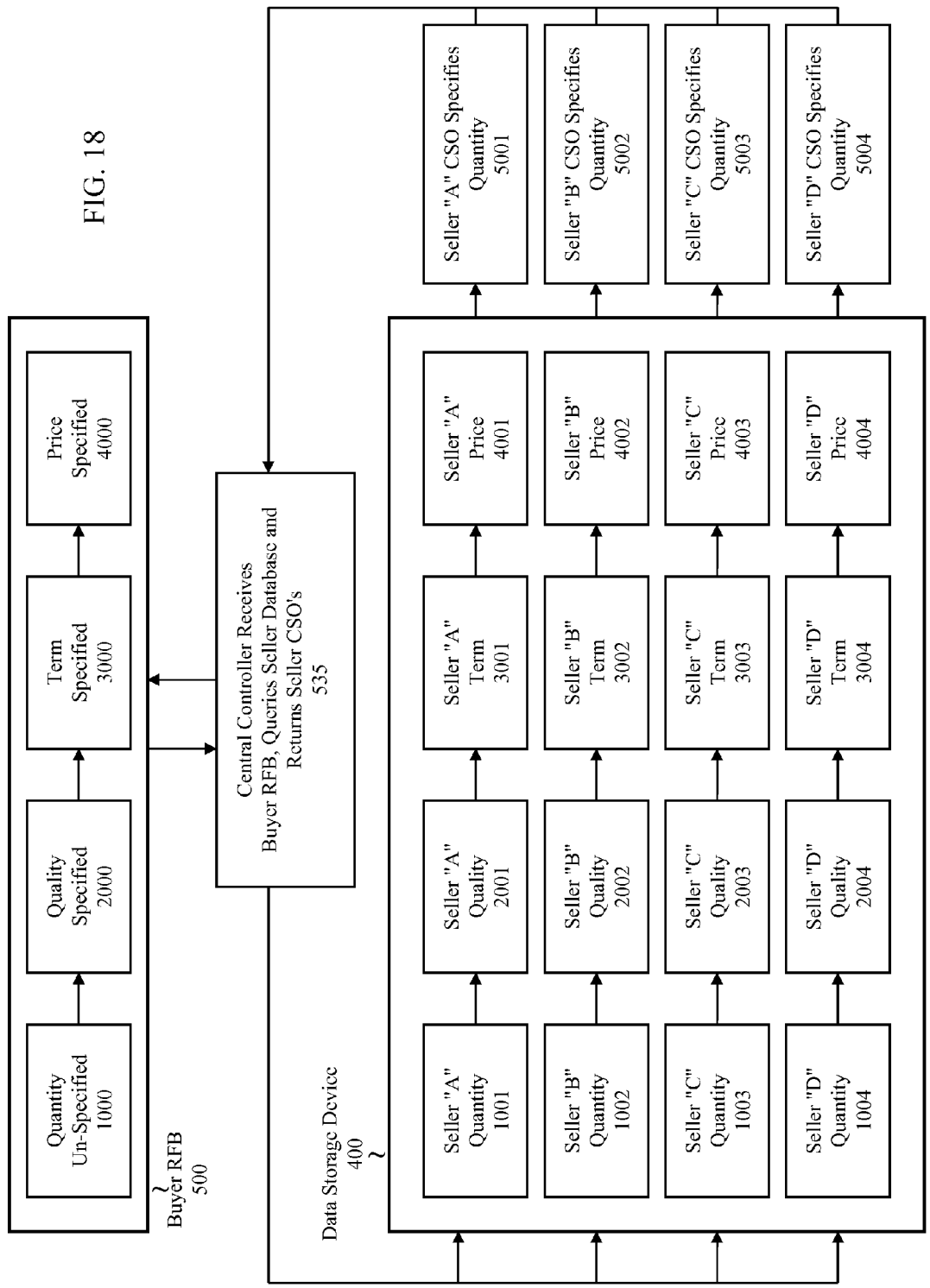
FIG. 18 shows a diagram illustrating how the controller displays results where the buyer has specified the quality, term and price not the quantity to which he would be bound.

Referring now to FIG. 18, there is illustrated therein a preferred embodiment of the method of the present invention under which a potential buyer specifies the quality 2000 of the product or service, the term 3000 and price 4000 to which he would agree to be bound. Central Controller 100 queries Data Storage Device (Element 400) for relevant seller CSOs which specify the quantity 1000 of the product or service where the quality 2000 of the product or service, term 3000 and price 4000 to which the buyer would agree to be bound are already specified by buyer.

Figure 19:
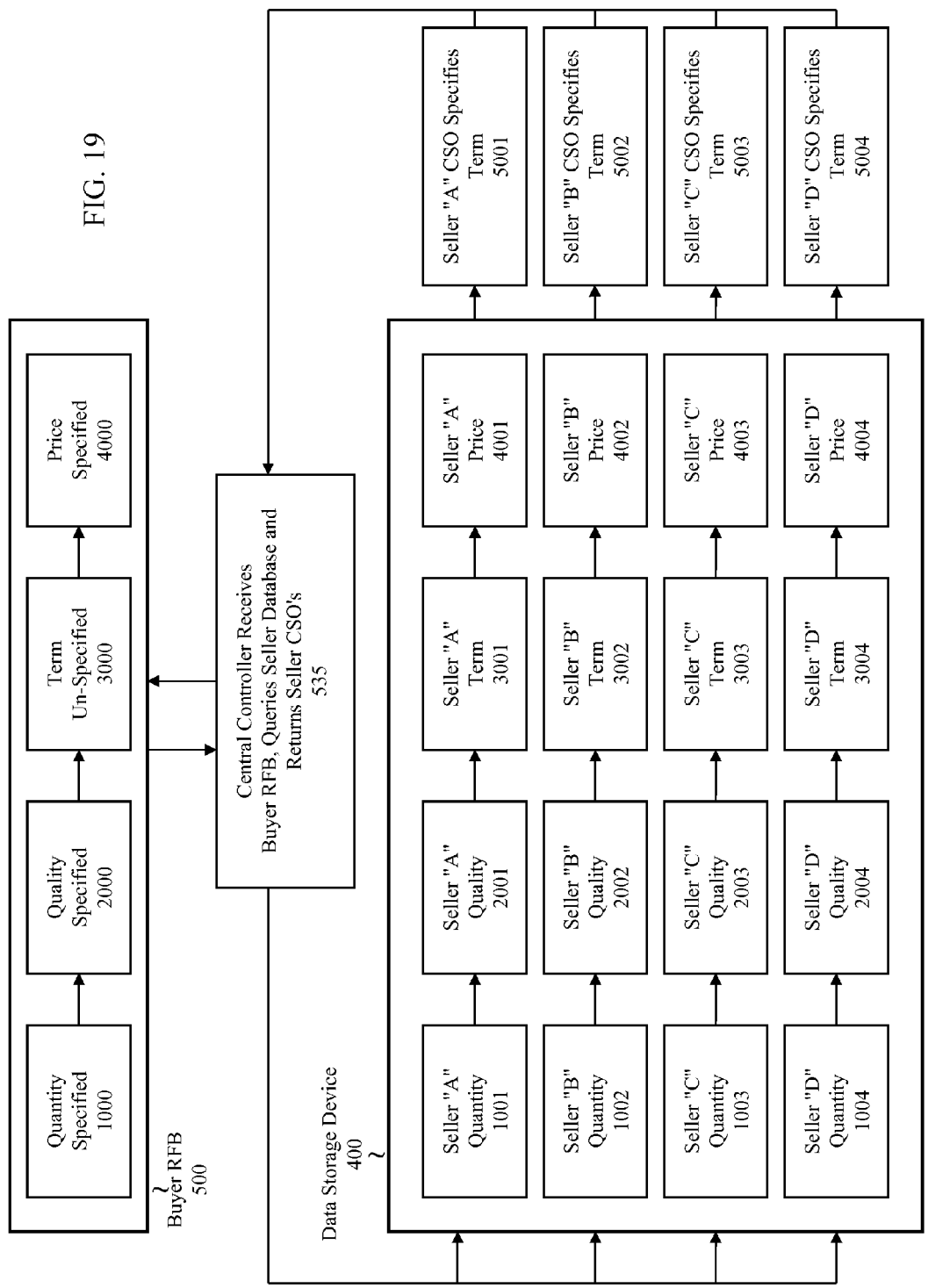
FIG. 19 shows a diagram illustrating how the controller displays results where the buyer has specified the quantity, quality and price but not the term to which he would be bound.

Referring now to FIG. 19, there is described a preferred embodiment of the method of the present invention under which a potential buyer specifies the quantity 1000, quality 2000 of the product or service, and the price 4000 to which he would agree to be bound, but not the term 3000. Central Controller 100 queries Data Storage Device (Element 400) for relevant seller CSOs which specify the term 3000 to which the buyer would agree to be bound where the quantity 1000, quality 2000 and price 4000 of the product or service to which the buyer would agree to be bound are already specified by buyer.

Figure 20:
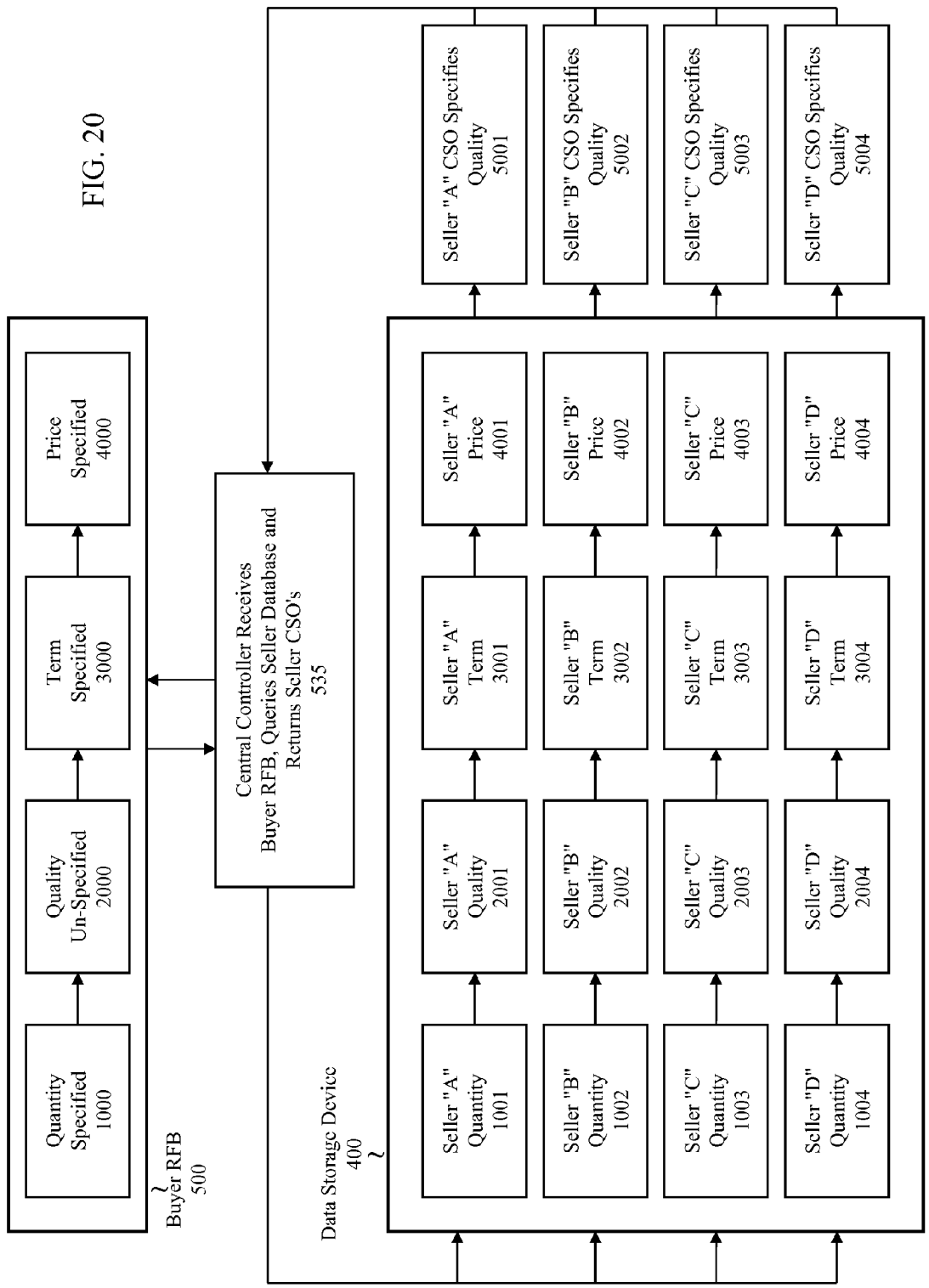
FIG. 20 shows a diagram illustrating how the controller displays results where the buyer has specified the quantity, term and price but not the quality to which he would be bound.

Referring now to FIG. 20, there is described a preferred embodiment of the method of the present invention under which a potential buyer specifies the quantity 1000, term 3000 and price 4000 but not the quality 2000 of the product or service, to which he would agree to be bound. Central Controller 100 queries Data Storage Device (Element 400) for relevant seller CSOs which specify the quality 2000 of the product or service where the quantity 1000, term 3000 and price 4000 of the product or service to which the buyer would agree to be bound are already specified by buyer.

Figure 21:
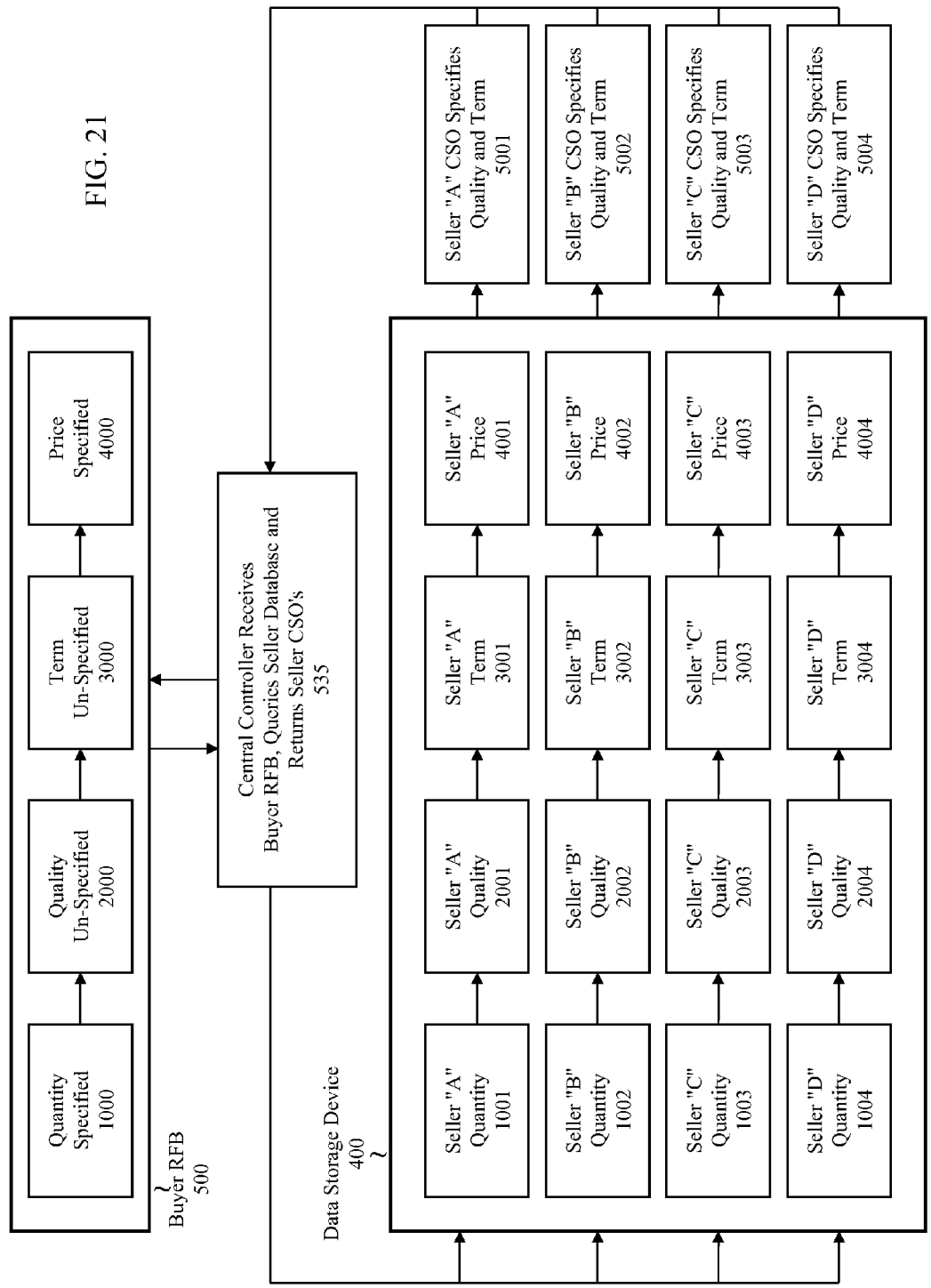
FIG. 21 shows a diagram illustrating how the controller displays results where the buyer has specified the quantity and price but not the quality or term to which he would be bound.

Referring now to FIG. 21, there is described a preferred embodiment of the method of the present invention under which a potential buyer specifies the quantity 1000 and the price 4000 but not the quality 2000 of the product or service or the term 3000 to which he would agree to be bound. Central Controller 100 queries Data Storage Device (Element 400) for relevant seller CSOs which specify the quality 2000 of the product or service and the term 3000 where the quantity 1000 and price 4000 of the product or service to which the buyer would agree to be bound are already specified by buyer.

Figure 22:
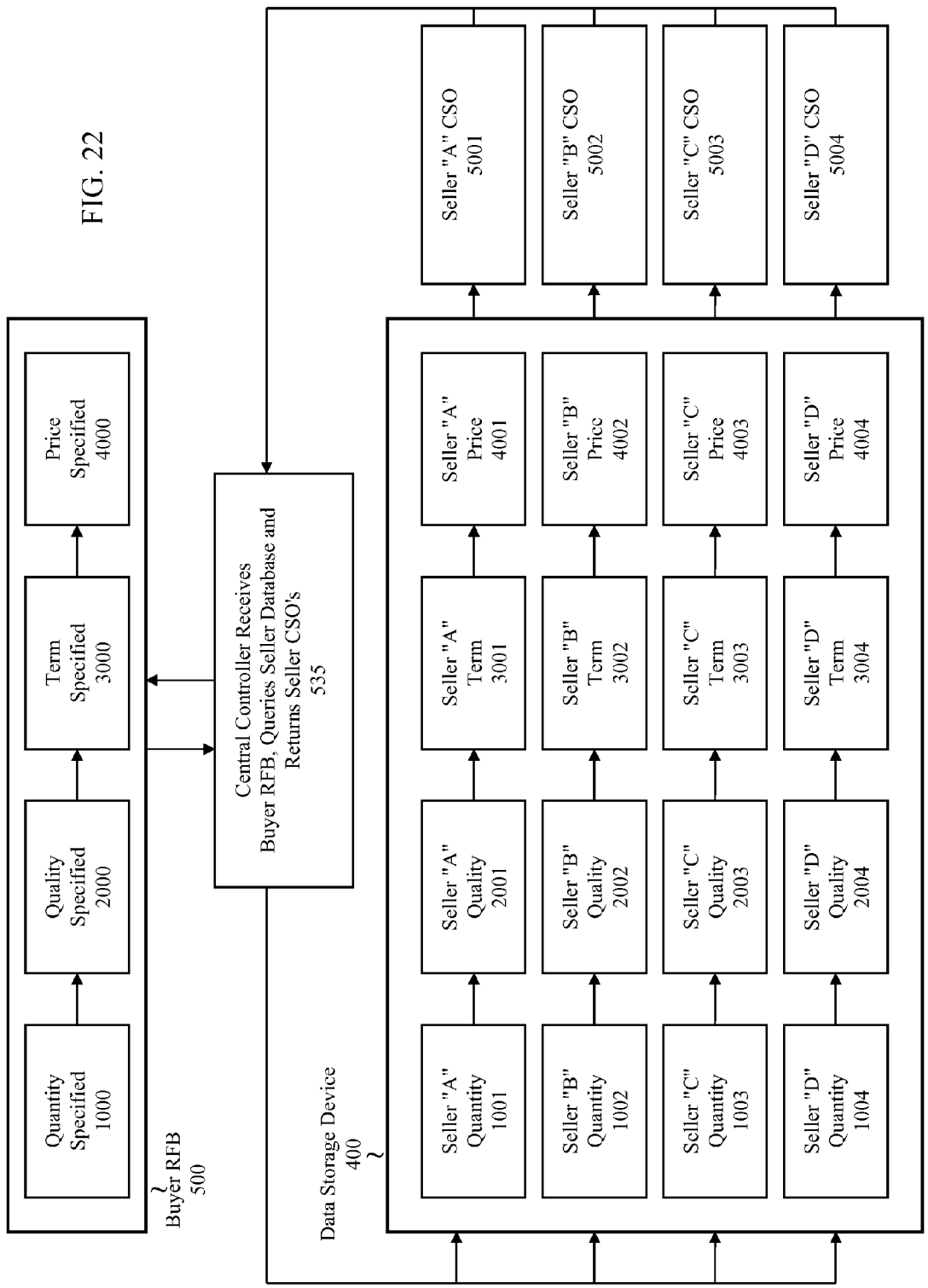
FIG. 22 shows a diagram illustrating how the controller displays results where the buyer has specified the quantity, quality, term and price to which he would be bound.

Referring now to FIG. 22, there is described a preferred embodiment of the method of the present invention under which a potential buyer specifies the quantity 1000, quality 2000, term 3000 and price 4000 of the product or service to which he would agree to be bound. Central Controller 100 queries Data Storage Device (Element 400) for relevant "BEST" seller CSOs which specify the quantity 1000, quality 2000, term 3000 and price 4000 of the product or service where the quantity 1000, quality 2000, term 3000 and price 4000 of the product or service to which the buyer would agree to be bound are already specified by buyer.

The following are examples of the economic value of a potential buyer and for which a potential seller would be eager and willing to issue a CSO:

You may transfer my $2,000.00 in credit card debt (quantity) to your credit card company if I am guaranteed a rate of LESS THAN 7.5% (quality) for a minimum of 12 months (term). See FIG. 7.

I will buy 2 (quantity) first-class round-trip (quality) airline seats New York to London leaving June 6 and returning June 30 (term). See FIG. 7.

I will lease the bandwidth equivalent (quality) to two (quantity) T-1 telecommunication lines between New York and Los Angeles. See FIG. 8.

I will re-finance my $100,000 (quantity) mortgage. See FIG. 9.

I will purchase Grade-A (quality) eggs. See FIG. 10.

I will purchase a 20-year (term) mortgage. See FIG. 11.

I will purchase a 20-year (term) mortgage at 10% annual interest rate (quality). See FIG. 12.

I will purchase 1000 kilowatt hours (quantity) of energy for 52 weeks (term). See FIG. 13.

I will purchase long-distance telephone service for 2¢ (price) per minute. See FIG. 14.

I will purchase long-distance telephone service for 2¢ (price) per minute for the next 5 years (term). See FIG. 15.

I will purchase long-distance telephone service for 2¢ (price) per minute and only utilize between 7:00 P.M. and 7:00 A.M. (quality). See FIG. 16.

I will agree to be bound to purchase a specific quantity of long distance minutes which is comprised of a specific quality, for a specific term at a specific price. See FIG. 17.

I will purchase long-distance telephone service for 2¢ (price) per minute, which I will be able to utilize anytime (quality) and will agree to be bound for one-year (term). See FIG. 18.

I will purchase 5000 minutes (quantity) monthly of "anytime" (quality) long-distance telephone service for 2¢ (price) per minute. See FIG. 19.

I will purchase 100,000 minutes (quantity) of long-distance telephone service within the next one-year (term) for 2¢ (price) per minute. See FIG. 20.

I will purchase 100,000 minutes (quantity) of long-distance telephone service for 2¢ (price) per minute. See FIG. 21.

I will purchase 100,000 minutes (quantity) of "anytime" (quality) long-distance telephone service for each of the next 12 months (term) for 2¢ (price) per minute. See FIG. 22.

Therefore, a system and method has been disclosed for effectuating truly buyer-driven and buyer-executed commerce in which only the buyer may "bind" the seller to its offer and which does not require personal or financial information to be submitted in advance before a RFB may be entered into the system, executed by the controller, and CSOs from prospective sellers produced. Not only is personal anonymity enhanced, but truly competitive prices are produced by our invention because a multitude of offers from a multitude of sellers are presented to the potential buyer. Further, because the present invention only permits a buyer to bind the seller on the back end of the transaction, buyer concerns regarding whether the buyer has bid too much are thereby alleviated. Further, because only the buyer is permitted to bind a seller, the buyer may submit an RFB more than once, changing any or all of the conditions to which he would agree to be bound in order to explore multiple offers from sellers and to better understand how changing one or more of the conditions affects the offers from the sellers.

Because the buyer guarantees the quantity and/or quality and/or term, and/or price or any combination of those conditions to which he would agree to be bound, sellers may easily pre-determine their offers based on the calculated value of 'capturing' that buyer his 'guaranteed loyalty'.

The present invention ensures that buyer receives the lowest possible price from among a plurality of possible price choices. Further, potential sellers can add to their revenue without breaking their existing sales channels, thus reducing their cost of sales.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method comprising:
   receiving, by a processing device, a Request For a Bid (RFB) associated with a sale of a commodity, the RFB identifying a purchase condition associated with the sale of the commodity;
   responsive to the RFB, accessing, by the processing device, a database including a plurality of Conditional Sale Offers (CSOs); and
   retrieving, by the processing device, a first Conditional Sale Offer (CSO) for the sale of the commodity from the database based on conformity of the first CSO with the purchase condition, wherein the first CSO is associated with a first sale condition that is different from the purchase condition.

2. The method of claim 1, wherein the purchase condition is a quantity associated with the commodity, a quality associated with the commodity, a time period associated with the commodity, or a price range associated with the commodity, or any combinations thereof.

3. The method of claim 1, wherein the first sale condition is a quantity associated with the commodity, a quality associated with the commodity, a time period associated with the commodity, or a price associated with the commodity, or any combinations thereof.

4. The method of claim 1, further comprising, retrieving, by the processing device, a second CSO from the database based on conformity of the second CSO with the purchase condition, wherein the second CSO is associated with a second sale condition that is different from the purchase condition.

5. The method of claim 4, further comprising, displaying, by the processing device, the first CSO or the second CSO, or any combinations thereof.

6. The method of claim 4, further comprising, ranking, by the processing device, the first CSO and the second CSO according to the first sale condition and the second sale condition.

7. The method of claim 1, further comprising, storing, by the processing device, the first CSO in the database prior to receiving the RFB.

8. The method of claim 1, wherein the plurality of CSOs are each associated with the commodity.

9. The method of claim 1, wherein the plurality of CSOs are each related to a plurality of respective commodities, wherein at least one of the respective commodities is different from one other of the respective commodities.

10. The method of claim 1, wherein the sale is an electronic transaction.

11. The method of claim 1, wherein the receiving the RFB further comprises receiving, by the processing device, the RFB from a remote device over an electronic network.

12. The method of claim 1, wherein the receiving the first CSO further comprises receiving, by the processing device, the first CSO from a remote device over a network.

13. The method of claim 1, wherein the RFB is anonymous or the first CSO is anonymous, or any combinations thereof.

14. The method of claim 1, further comprising receiving, by the processing device, an indication of acceptance of the first CSO wherein the acceptance is associated with a buyer identifier and the RFB.

15. The method of claim 14, further comprising verifying, by the processing device, that a buyer associated with the buyer identifier has sufficient funds to purchase the commodity upon acceptance of the first CSO.

16. The method of claim 15, wherein the first CSO is conditioned upon verification that the buyer has sufficient funds to purchase the commodity.

17. The method of claim 1, further comprising preventing, by the processing device, modification of the first CSO within a predetermined time period.

18. The method of claim 1, wherein the purchase condition identifies an upper threshold value or lower threshold value, or any combinations thereof associated with the purchase condition.

19. An apparatus comprising:
means for receiving a Request For a Bid (RFB) associated with a sale of a commodity, the RFB identifying a purchase condition associated with the sale of the commodity;
means for accessing a database responsive to the RFB, the database including a plurality of Conditional Sale Offers (CSOs); and
means for retrieving a first Conditional Sale Offer (CSO) for the sale of the commodity from the database based on conformity of the first CSO with the purchase condition, wherein the first CSO is associated with a first sale condition that is different from the purchase condition.

20. The apparatus of claim 19, wherein the purchase condition is a quantity associated with the commodity, a quality associated with the commodity, a time period associated with the commodity, or a price range associated with the commodity, or any combinations thereof.

21. The apparatus of claim 19, wherein the first sale condition is a quantity associated with the commodity, a quality associated with the commodity, a time period associated with the commodity, or a price associated with the commodity, or any combinations thereof.

22. The apparatus of claim 19, further comprising, means for retrieving a second CSO from the database based on conformity of the second CSO with the purchase condition, wherein the second CSO is associated with a second sale condition that is different from the purchase condition.

23. The apparatus of claim 22, further comprising, means for displaying the first CSO or the second CSO, or any combinations thereof.

24. The apparatus of claim 22, further comprising, means for ranking the first CSO and the second CSO according to the first sale condition and the second sale condition.

25. The apparatus of claim 19, further comprising, means for storing the first CSO in the database prior to receiving the RFB.

26. The apparatus of claim 19, wherein the plurality of CSOs are each associated with the commodity.

27. The apparatus of claim 19, wherein the plurality of CSOs are each related to a plurality of respective commodities, wherein at least one of the respective commodities is different from one other of the respective commodities.

28. The apparatus of claim 19, wherein the sale is an electronic transaction.

29. The apparatus of claim 19, wherein the receiving the RFB further comprises receiving the RFB from a remote device over an electronic network.

30. The apparatus of claim 19, wherein the means for receiving the first CSO further comprises means for receiving the first CSO from a remote device over a network.

31. The apparatus of claim 19, wherein the RFB is anonymous or the first CSO is anonymous, or a combination thereof.

32. The apparatus of claim 19, further comprising means for receiving an indication of acceptance of the first CSO wherein the acceptance is associated with a buyer identifier and the RFB.

33. The apparatus of claim 32, further comprising means for verifying that a buyer associated with the buyer identifier has sufficient funds to purchase the commodity upon acceptance of the first CSO.

34. The apparatus of claim 33, wherein the first CSO is conditioned upon verification that the buyer has sufficient funds to purchase the commodity.

35. The apparatus of claim 19, further comprising means for preventing modification of the first CSO within a predetermined time period.

36. The apparatus of claim 19, wherein the purchase condition identifies an upper threshold value or a lower threshold value, or any combinations thereof associated with the purchase condition.

37. A computer-readable non-transitory memory device having instructions stored thereon that, in response to execution by a processing device, cause the processing device to perform operations comprising:
receiving a Request For a Bid (RFB) associated with a sale of a commodity, the RFB identifying a purchase condition associated with the sale of the commodity;
responsive to the RFB, accessing a database including a plurality of Conditional Sale Offers (CSOs); and
retrieving a first Conditional Sale Offer (CSO) for the sale of the commodity from the database based on conformity of the first CSO with the purchase condition, wherein the first CSO is associated with a first sale condition that is different from the purchase condition.

38. The computer-readable non-transitory memory device of claim 37, wherein the purchase condition is a quantity associated with the commodity, a quality associated with the commodity, a time period associated with the commodity, or a price range associated with the commodity, or any combinations thereof.

39. The computer-readable non-transitory memory device of claim 37, wherein the first sale condition is a quantity associated with the commodity, a quality associated with the commodity, a time period associated with the commodity, or a price associated with the commodity, or any combinations thereof.

40. The computer-readable non-transitory memory device of claim 37, wherein the operations further comprise retrieving a second CSO from the database based on conformity of the second CSO with the purchase condition, wherein the second CSO is associated with a second sale condition that is different from the purchase condition.

41. The computer-readable non-transitory memory device of claim 40, wherein the operations further comprise displaying the first CSO or the second CSO, or any combinations thereof.

42. The computer-readable non-transitory memory device of claim 40, wherein the operations further comprise ranking the first CSO and the second CSO according to the first sale condition and the second sale condition.

43. The computer-readable non-transitory memory device of claim 37, wherein the operations further comprise storing the first CSO in the database prior to receiving the RFB.

44. The computer-readable non-transitory memory device of claim 37, wherein the plurality of CSOs are each associated with the commodity.

45. The computer-readable non-transitory memory device of claim 37, wherein the plurality of CSOs are each related to a plurality of respective commodities, wherein at least one of the respective commodities is different from one other of the respective commodities.

46. The computer-readable non-transitory memory device of claim 37, wherein the sale is an electronic transaction.

47. The computer-readable non-transitory memory device of claim 37, wherein the operations further comprise receiving the RFB from a remote device over an electronic network.

48. The computer-readable non-transitory memory device of claim 37, wherein the operations further comprise receiving the first CSO from a remote device over a network.

49. The computer-readable non-transitory memory device of claim 37, wherein the RFB is anonymous or the first CSO is anonymous, or a combination thereof.

50. The computer-readable non-transitory memory device of claim 37, wherein the operations further comprise receiving an indication of acceptance of the first CSO wherein the acceptance is associated with a buyer identifier and the RFB.

51. The computer-readable non-transitory memory device of claim 50, wherein the operations further comprise verifying that a buyer associated with the buyer identifier has sufficient funds to purchase the commodity upon acceptance of the first CSO.

52. The computer-readable non-transitory memory device of claim 51, wherein the first CSO is conditioned upon verification that the buyer has sufficient funds to purchase the commodity.

53. The computer-readable non-transitory memory device of claim 37, wherein the operations further comprise preventing modification of the first CSO within a predetermined time period.

54. The computer-readable non-transitory memory device of claim 37, wherein the purchase condition identifies an upper threshold value or lower threshold value, or any combinations thereof associated with the purchase condition.

55. An apparatus, comprising:
a memory device configured to store instructions associated with an application program; and
a processor that, in response to executing the instructions stored in the memory device, is configured to:
receive a Request For a Bid (RFB) associated with a sale of a commodity, the RFB identifying a purchase condition associated with the sale of the commodity;
access a database responsive to the RFB, the database including a plurality of Conditional Sale Offers (CSOs); and
retrieve a first Conditional Sale Offer (CSO) for the sale of the commodity from the database based on conformity of the first CSO with the purchase condition, wherein the first CSO is associated with a first sale condition that is different from the purchase condition.

56. The apparatus of claim 55, wherein the purchase condition is a quantity associated with the commodity, a quality associated with the commodity, a time period associated with the commodity, or a price range associated with the commodity, or any combinations thereof.

57. The apparatus of claim 55, wherein the first sale condition is a quantity associated with the commodity, a quality associated with the commodity, a time period associated with the commodity, or a price associated with the commodity, or any combinations thereof.

58. The apparatus of claim 55, wherein the processor is further configured to retrieve a second CSO from the database based on conformity of the second CSO with the purchase condition, wherein the second CSO is associated with a second sale condition that is different from the purchase condition.

59. The apparatus of claim 58, wherein the processor is further configured to display the first CSO or the second CSO, or any combinations thereof.

60. The apparatus of claim 58, wherein the processor is further configured to rank the first CSO and the second CSO based on the first sale condition and the second sale condition.

61. The apparatus of claim 55, wherein the processor is further configured to store the first CSO in the database prior to receiving the RFB.

62. The apparatus of claim 55, wherein the plurality of CSOs are each associated with the commodity.

63. The apparatus of claim 55, wherein the plurality of CSOs are related to a plurality of respective commodities, wherein at least one of the respective commodities is different from one other of the respective commodities.

64. The apparatus of claim 55, wherein the sale is an electronic transaction.

65. The apparatus of claim 55, wherein the processor is further configured to receive the RFB from a remote device over an electronic network.

66. The apparatus of claim 55, wherein the processor is further configured to receive the first CSO from a remote device over a network.

67. The apparatus of claim 55, wherein the RFB is anonymous or the first CSO is anonymous, or any combinations thereof.

68. The apparatus of claim 55, wherein the processor is further configured to receive an indication of acceptance of the first CSO, wherein the acceptance is associated with a buyer identifier and the RFB.

69. The apparatus of claim 68, wherein the processor is further configured to verify that a buyer associated with the buyer identifier has sufficient funds to purchase the commodity upon acceptance of the first CSO.

70. The apparatus of claim 69, wherein the first CSO is conditioned upon verification that the buyer has sufficient funds to purchase the commodity.

71. The apparatus of claim 55, wherein the processor is further configured to prevent modification of the first CSO within a predetermined time period.

72. The apparatus of claim 55, wherein the purchase condition identifies an upper threshold value or a lower threshold value, or any combinations thereof associated with the purchase condition.

* * * * *